(12) United States Patent
Seward et al.

(10) Patent No.: US 11,196,756 B2
(45) Date of Patent: Dec. 7, 2021

(54) IDENTIFYING NOTABLE EVENTS BASED ON EXECUTION OF CORRELATION SEARCHES

(71) Applicant: Splunk Inc., San Francisco, CA (US)

(72) Inventors: Mark Seward, Burlingame, CA (US); John Robert Coates, Berkeley, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 15/421,393

(22) Filed: Jan. 31, 2017

(65) Prior Publication Data

US 2017/0142143 A1 May 18, 2017

Related U.S. Application Data

(63) Continuation of application No. 14/135,427, filed on Dec. 19, 2013, now Pat. No. 10,367,827.

(51) Int. Cl.
*H04L 29/06* (2006.01)
*G06F 16/21* (2019.01)
*G06F 16/951* (2019.01)

(52) U.S. Cl.
CPC ........ *H04L 63/1416* (2013.01); *G06F 16/212* (2019.01); *G06F 16/951* (2019.01); *H04L 63/1425* (2013.01)

(58) Field of Classification Search
CPC ............. H04L 63/1416; H04L 63/1425; G06F 17/30864; G06F 17/30294

(Continued)

(56) References Cited

U.S. PATENT DOCUMENTS 7,836,041 B1   11/2010   Jain et al.
8,162,125 B1   4/2012   Csulits et al.
(Continued)

OTHER PUBLICATIONS

"2012_SANS.pdf—Collective-Intelligence-Framework—2012_Sans/ NIST—The Intelligence Layer—Google Hosting," Oct. 7, 2012, downloaded from https://web.archive.org/web/20140606140057/ http://collective-intelligence-framework.googlecode.com/files/2012_ SANS.pdf on Jul. 2, 2013, 36 pages.
(Continued)

*Primary Examiner* — Venkat Perungavoor
*Assistant Examiner* — Peiliang Pan
(74) *Attorney, Agent, or Firm* — Nicholson De Vos Webster & Elliott LLP

(57) ABSTRACT

Systems and methods are provided for identifying network addresses and/or IDs of a deduplicated list among network data, machine data, and/or events derived from network data and/or machine data, and for identifying notable events by searching for the presence of network addresses and/or network IDs that are deduplicated across lists received from multiple external sources. One method includes receiving a plurality of lists of network locations, wherein each list is received from over a network, wherein each of the network locations includes a domain name or an IP address, and wherein at least two of the plurality of lists each include a same network location; aggregating the plurality of lists of network locations into a deduplicated list of unique network locations; and searching network data or machine data for a network location included in the deduplicated list of unique network locations.

27 Claims, 20 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,554,907 B1 | 10/2013 | Chen et al. | |
| 8,561,193 B1 | 10/2013 | Srivastava et al. | |
| 8,700,561 B2* | 4/2014 | Ahuja | G06F 16/93 707/603 |
| 8,707,441 B1* | 4/2014 | Cidambi | G06F 21/56 726/25 |
| 8,751,486 B1* | 6/2014 | Neeman | G06F 17/30908 707/722 |
| 8,775,556 B1* | 7/2014 | Matthews | G06Q 30/0201 709/217 |
| 8,812,480 B1* | 8/2014 | Watson | H04L 69/12 707/710 |
| 8,850,263 B1* | 9/2014 | Yourtee | G06F 11/0709 714/20 |
| 8,874,755 B1* | 10/2014 | Deklich | G06F 15/177 709/220 |
| 8,914,406 B1* | 12/2014 | Haugsnes | H04L 63/1441 707/769 |
| 8,929,640 B1* | 1/2015 | Mennie | G06K 9/00469 382/135 |
| 8,944,234 B1* | 2/2015 | Csulits | G07D 7/004 194/206 |
| 9,043,302 B1* | 5/2015 | Shimshoni | G06F 17/30716 707/706 |
| 9,715,239 B2* | 7/2017 | Fadell | G05D 23/1902 |
| 9,779,250 B1 | 10/2017 | Hui et al. | |
| 9,807,192 B1* | 10/2017 | Fletcher | H04L 67/2861 |
| 9,916,379 B2* | 3/2018 | Neeman | G06F 17/30908 |
| 2002/0123966 A1* | 9/2002 | Chu | H04L 63/1425 705/43 |
| 2003/0135495 A1* | 7/2003 | Vagnozzi | G06F 17/30324 |
| 2003/0154402 A1* | 8/2003 | Pandit | G06F 21/552 726/23 |
| 2003/0182379 A1 | 9/2003 | Henry | |
| 2004/0093513 A1 | 5/2004 | Cantrell et al. | |
| 2005/0043961 A1* | 2/2005 | Torres | G06F 21/55 705/35 |
| 2005/0102534 A1 | 5/2005 | Wong | |
| 2005/0216955 A1* | 9/2005 | Wilkins | H04L 63/1408 726/23 |
| 2006/0015597 A1 | 1/2006 | Scott et al. | |
| 2006/0085667 A1* | 4/2006 | Kubota | G06F 17/30719 714/4.1 |
| 2006/0117385 A1 | 6/2006 | Mester et al. | |
| 2006/0117387 A1 | 6/2006 | Gunsalus et al. | |
| 2006/0161816 A1* | 7/2006 | Gula | H04L 41/065 714/39 |
| 2006/0167871 A1 | 7/2006 | Sorenson et al. | |
| 2007/0101431 A1* | 5/2007 | Clift | G06F 21/56 726/24 |
| 2007/0111920 A1 | 5/2007 | Baur et al. | |
| 2007/0197233 A1 | 8/2007 | Feng | |
| 2007/0260931 A1 | 11/2007 | Aguilar-Macias et al. | |
| 2007/0261099 A1* | 11/2007 | Broussard | H04L 63/102 726/1 |
| 2007/0271280 A1* | 11/2007 | Chandasekaran | G06F 9/542 |
| 2008/0034425 A1* | 2/2008 | Overcash | H04L 63/1425 726/22 |
| 2008/0060071 A1* | 3/2008 | Hennan | H04L 63/1416 726/22 |
| 2008/0140640 A1* | 6/2008 | Raff | H04L 29/06 |
| 2008/0222532 A1 | 9/2008 | Mester et al. | |
| 2009/0106215 A1* | 4/2009 | Jain | G06F 16/24568 |
| 2009/0204723 A1* | 8/2009 | Tonsing | H04L 47/41 709/238 |
| 2009/0240568 A1* | 9/2009 | Ramer | G06F 17/30749 705/14.49 |
| 2009/0249482 A1 | 10/2009 | Sarathy | |
| 2010/0017360 A1 | 1/2010 | Bansal et al. | |
| 2010/0058446 A1 | 3/2010 | Thwaites | |
| 2010/0082811 A1 | 4/2010 | Van et al. | |
| 2010/0094878 A1 | 4/2010 | Soroca et al. | |
| 2010/0186014 A1* | 7/2010 | Vaghani | G06F 3/06 718/101 |
| 2010/0262688 A1* | 10/2010 | Hussain | H04L 63/1433 709/224 |
| 2010/0299398 A1* | 11/2010 | Nagoya | H04L 29/12594 709/206 |
| 2010/0323633 A1 | 12/2010 | Pani et al. | |
| 2011/0029549 A1* | 2/2011 | Pandya | G11C 15/00 707/758 |
| 2011/0087076 A1 | 4/2011 | Brynelsen et al. | |
| 2011/0093098 A1* | 4/2011 | Kostadinov | G05B 19/042 700/87 |
| 2011/0093491 A1* | 4/2011 | Zabback | G06F 17/30451 707/769 |
| 2011/0153508 A1 | 6/2011 | Jhunjhunwala | |
| 2011/0153604 A1* | 6/2011 | Yu | G06F 17/2247 707/737 |
| 2011/0225138 A1* | 9/2011 | Johnston | G06Q 40/02 707/706 |
| 2011/0283360 A1 | 11/2011 | Abadi et al. | |
| 2011/0320715 A1 | 12/2011 | Ickman et al. | |
| 2012/0005743 A1 | 1/2012 | Kitazawa et al. | |
| 2012/0124064 A1* | 5/2012 | Syrowitz | G06F 16/90344 707/754 |
| 2012/0174224 A1 | 7/2012 | Thomas et al. | |
| 2013/0019309 A1* | 1/2013 | Strayer | G06F 21/554 726/23 |
| 2013/0054601 A1 | 2/2013 | Whitlock et al. | |
| 2013/0073573 A1* | 3/2013 | Huang | G06F 16/254 707/755 |
| 2013/0148862 A1 | 6/2013 | Roach et al. | |
| 2013/0160123 A1 | 6/2013 | Wood | |
| 2013/0162529 A1* | 6/2013 | Turk | G06Q 10/00 345/157 |
| 2013/0166607 A1* | 6/2013 | Turk | G06Q 10/04 707/803 |
| 2013/0167196 A1 | 6/2013 | Spencer et al. | |
| 2013/0198376 A1 | 8/2013 | Landa et al. | |
| 2013/0263272 A1 | 10/2013 | Banerjee et al. | |
| 2013/0282739 A1 | 10/2013 | Anderson et al. | |
| 2013/0311651 A1* | 11/2013 | Olsson | G06Q 10/06 709/224 |
| 2013/0318536 A1* | 11/2013 | Fletcher | G06F 9/5011 718/104 |
| 2013/0318604 A1* | 11/2013 | Coates | H04L 63/1416 726/22 |
| 2014/0032671 A1 | 1/2014 | Chhatrapati et al. | |
| 2014/0036768 A1 | 2/2014 | Gao et al. | |
| 2014/0074850 A1* | 3/2014 | Noel | G06F 9/542 707/741 |
| 2014/0082701 A1 | 3/2014 | Pasion et al. | |
| 2014/0101076 A1 | 4/2014 | Martin et al. | |
| 2014/0156642 A1* | 6/2014 | Johnson | G06F 17/30091 707/722 |
| 2014/0207450 A1 | 7/2014 | Lavoie et al. | |
| 2014/0230062 A1 | 8/2014 | Kumaran | |
| 2014/0236889 A1* | 8/2014 | Vasan | H04L 67/1097 707/610 |
| 2014/0283083 A1 | 9/2014 | Gula et al. | |
| 2014/0359694 A1* | 12/2014 | Maxwell | H04L 63/1425 726/1 |
| 2015/0026167 A1* | 1/2015 | Neels | G06F 16/9535 707/723 |
| 2015/0039623 A1 | 2/2015 | Pandit et al. | |
| 2015/0040052 A1* | 2/2015 | Noel | G06F 3/04847 715/771 |
| 2015/0082399 A1* | 3/2015 | Wu | H04L 9/0897 726/6 |
| 2015/0128274 A1* | 5/2015 | Giokas | H04L 63/1425 726/23 |
| 2015/0154269 A1* | 6/2015 | Miller | G06F 16/248 715/780 |
| 2015/0201031 A1 | 7/2015 | James et al. | |

(56) References Cited

U.S. PATENT DOCUMENTS

| | | | | |
|---|---|---|---|---|
| 2015/0207813 | A1* | 7/2015 | Reybok | H04L 63/145 726/22 |
| 2015/0222656 | A1* | 8/2015 | Haugsnes | H04L 63/1441 726/23 |
| 2015/0256554 | A1* | 9/2015 | Sakakibara | G06F 11/34 726/25 |
| 2015/0286745 | A1 | 10/2015 | Chen et al. | |
| 2015/0301996 | A1* | 10/2015 | Hinterbichler | G06F 11/3656 715/230 |
| 2015/0339312 | A1* | 11/2015 | Lin | G06F 16/2471 707/666 |
| 2016/0055225 | A1* | 2/2016 | Xu | H04L 67/1097 707/624 |
| 2017/0139928 | A1* | 5/2017 | Neeman | G06F 17/3066 |
| 2017/0139996 | A1* | 5/2017 | Marquardt | G06F 16/221 |
| 2017/0142149 | A1* | 5/2017 | Coates | H04L 63/1433 |
| 2017/0206205 | A1* | 7/2017 | Neeman | G06F 17/3066 |
| 2017/0302514 | A1* | 10/2017 | Deklich | H04L 41/0806 |

OTHER PUBLICATIONS

Advisory Action from U.S. Appl. No. 14/135,427, dated Aug. 25, 2017, 5 pages.
Advisory Action from U.S. Appl. No. 14/135,427, dated Nov. 4, 2016, 6 pages.
Advisory Action from U.S. Appl. No. 14/135,427, dated Oct. 29, 2014, 5 pages.
"Arcosi—ArcSight Open Source Intelligence Utility—Google Project Hosting," downloaded from http://code.google.com/p/arcosi/ on Dec. 14, 2011, 2 pages.
"Collective-Intelligence-Framework—The Intelligence Layer—Google Project Hosting," downloaded from http://code.google.com/p/collective-intelligence-framework/ on Oct. 28, 2013, 3 pages.
"CommunityExamples—Collective-Intelligence-Framework—A Page of 3rd Party Community Examples—A Framework for Warehousing Intelligence Bits—Google Project H . . . ," Aug. 15, 2012, downloaded from http://code.google.com/p/collective-intelligence-framework/wiki/CommunityExamples on Aug. 22, 2012, 1 page.
Final Office Action from U.S. Appl. No. 14/135,427, dated Aug. 6, 2014, 13 pages.
Final Office Action from U.S. Appl. No. 14/135,427, dated Aug. 24, 2015, 13 pages.
Final Office Action from U.S. Appl. No. 14/135,427, dated Jul. 27, 2018, 26 pages.
Final Office Action from U.S. Appl. No. 14/135,427, dated Jun. 8, 2016, 14 pages.
Final Office Action from U.S. Appl. No. 14/135,427, dated Jun. 15, 2017, 22 pages.
Gorzelak K., et al., "Proactive Detection of Network Security Incidents, report," Dec. 7, 2011, European Network and Information Security Agency (ENISA), 147 pages.
"I'm wes . . . i'm here to help you share data. collectiveintel.org," May 23, 2013, downloaded from https://web.archive.org/web/20140606135749/https://collective-intelligence-framework.googlecode.com/files/2013_auscert_wesyoung.pdf, 37 pages.
Kijewski P., et al., "Proactive Detection and Automated Exchange of Network Security Incidents," STO-MP-IST-111, downloaded from http:/www.enisa.europa.eu/activities/cert/support/proactive-detection/proactive-detection-report on Jul. 6, 2013, 20 pages.
Non-Final Office Action from U.S. Appl. No. 14/135,427, dated Dec. 12, 2017, 24 pages.
Non-Final Office Action from U.S. Appl. No. 14/135,427, dated Dec. 30, 2016, 17 pages.
Non-Final Office Action from U.S. Appl. No. 14/135,427, dated Dec. 31, 2015, 14 pages.
Non-Final Office Action from U.S. Appl. No. 14/135,427, dated Mar. 12, 2014, 11 pages.
Non-Final Office Action from U.S. Appl. No. 14/135,427, dated Mar. 18, 2015, 12 pages.
"Preso—Collective-Intelligence-Framework—One-Sentence Summary of this Page.—The Intelligence Layer—Google Project Hosting," May 28, 2013, downloaded from http://code.google.com/p/collective-intelligence-framework/wiki/Preso on Oct. 23, 2013, 2 pages.
"ProjectAvenger—Collective-Intelligence-Framework—The Avenger Project—A Framework for Warehousing Intelligence Bits—Google Project Hosting," Apr. 19, 2012, downloaded from http://code.google.com/p/collective-intelligence-framework/wiki/ProjectAvenger on Oct. 29, 2012, 1 page.
"Threat Stream," downloaded from http://www.threatstream.com/ on Oct. 11, 2013, 2 pages.
"Threat/Stream," OPTIC data sheet, Apr. 2014, downloaded from http://threatstream.com/wp-content/uploads/2014/04/Threatstream-OPTIC.pdf, 2 pages.
"WhatisCIF—Collective-Intelligence-Framework—Explanation of CIF—The Intelligence Layer—Google Project Hosting," Jun. 19, 2013, downloaded from http://code.google.com/p/collective-intelligence-frameworklwiki/WhatisCIF on Jul. 9, 2013, 3 pages.
Notice of Allowance from U.S. Appl. No. 14/135,427, dated Mar. 12, 2019, 10 pages.

* cited by examiner

THREAT LISTS
DATA INPUTS » THREAT LISTS

[NEW]
SHOWING 1-17 OF 17 ITEMS

RESULTS PER PAGE [25]

| NAME | TYPE | DESCRIPTION | URL | INTERVAL | STATUS | ACTION |
|---|---|---|---|---|---|---|
| EMERGING_THREATS_COMPROMISED_IP_BLOCKLIST | MALICIOUS | EMERGING THREATS COMPROMISED IPS BLOCKLIST | HTTP://RULES.EMERGINGTHREATS.NET/BLOCKRULES/COMPROMISED-IPS.TXT | 43200 | DISABLED\|ENABLE | CLONE |
| EMERGING_THREATS_IP_BLOCKLIST | MALICIOUS | EMERGING THREATS FWIP RULES | HTTP://RULES.EMERGINGTHREATS.NET/FWRULES/EMERGING-BLOCK-IPS.TXT | 43200 | DISABLED\|ENABLE | CLONE |
| EMERGING_THREATS_MALVERTISERS_BLOCKLIST | MALICIOUS | EMERGING THREATS MALVERTISERS BLOCKLIST | HTTP://RULES.EMERGINGTHREATS.NET/BLOCKRULES/RBN-MALVERTISERS-IPS.TXT | 43200 | DISABLED\|ENABLE | CLONE |
| IBLOCKLIST_LOGMEIN | NETWORKS | ADDRESSES THAT ARE USED BY THE LOGMEIN PRODUCT TO ENABLE UNAUTHORIZED REMOTE ACCESS | HTTP://LIST_IBLOCKLIST.COM/?LIST=LOGMEIN | 43200 | ENABLED\|DISABLE | CLONE |

ADD NEW
DATA INPUTS » THREAT LISTS » ADD NEW

312

THREAT LIST SETTINGS
NAME*
| IBLOCKLIST_HIJACKED |
THE THREAT LIST NAME.
TYPE*
| HIJACKED |
THE TYPE OF THREAT LIST (E.G. "MALWARE").
DESCRIPTION*
| HIJACKED |
THE THREAT LIST DESCRIPTION.
URL*
| HTTP://LIST.IBLOCKLIST.COM/?LIST=BT_HIJACKED&FILEFORMAT=P2P&ARCHIVEFORMAT= |
THE THREAT LIST URL.
INTERVAL
| 43200 |
THE INTERVAL AT WHICH TO DOWNLOAD THE THREAT LIST.
POST ARGUMENTS
| | |
POST ARGUMENTS TO BE PASSED TO THE URL.

PARSING OPTIONS
DELIMITING REGULAR EXPRESSION
| |
A DELIMITER USED TO SPLIT LINES IN A THREAT LIST.
EXTRACTING REGULAR EXPRESSION
| |
A REGULAR EXPRESSION USED TO EXTRACT FIELDS FROM INDIVIDUAL LINES OF A THREAT LIST.
FIELDS*
| |
A TRANSFORMS CONF-STYLE EXPRESSION USED TO RENAME OR COMBINE FIELDS.
IGNORING REGULAR EXPRESSION
| |
A REGULAR EXPRESSION USED TO IGNORE LINES IN A THREAT LIST.

DOWNLOAD OPTIONS

FIG. 8

SECURITY POSTURE  INCIDENT REVIEW  PREDICTIVE ANALYTICS  EVENT INVESTIGATORS ▶  ADVANCED THREAT ▶  SECURITY DOMAINS ▶  AUDIT ▶  SEARCH ▶  CONFIGURE ▶  ENTERPRISE SECURITY

CONFIGURE > CORRELATION SEARCHES

CORRELATION SEARCHES

SHOWING 1-25 OF 45 ITEMS

[1] 2 NEXT▶

[NEW] — 324

☐ SHOW ONLY REAL-TIME SEARCHES — 322

RESULTS PER PAGE [25 ◀▶]

| CORRELATION SEARCH NAME | SECURITY DOMAIN | TYPE | NEXT SCHEDULED TIME | STATUS — 326 |
|---|---|---|---|---|
| ☐ BRUTE FORCE ACCESS BEHAVIOR DETECTED | ACCESS | REAL TIME | N/A | ENABLED \| DISABLED \| CHANGE TO SCHEUDLED |
| ☐ CLEARTEXT PASSWORD AT REST DETECTED | ACCESS | REAL TIME | N/A | ENABLED \| DISABLED \| CHANGE TO SCHEUDLED |
| ☐ COMPLETELY INACTIVE ACCOUNT | ACCESS | SCHEDULED | 2013-12-10 15:55:00 PST | ENABLED \| DISABLED \| CHANGE TO REAL-TIME |

| NAME ▲ | CATEGORY ▲ | DESCRIPTION | RISK ▲ | TYPE ▲ | IP ▲ | SUBNET ▲ | IP_COUNT ▲ |
|---|---|---|---|---|---|---|---|
| IBLOCKLIST_TOR IBLOCKLIST_PROXY | | THE ONION ROUTER TOR | | NETWORKS PROXY | 1.169.188.209 | 32 | 1 |
| IBLOCKLIST_TOR | | THE ONION ROUTER | | NETWORKS | 2.5.201.253 | 32 | 1 |
| IBLOCKLIST_TOR IBLOCKLIST_PROXY | | THE ONION ROUTER TOR | | NETWORKS PROXY | 2.29.118.86 | 32 | 1 |
| IBLOCKLIST_TOR IBLOCKLIST_PROXY | | THE ONION ROUTER TOR | | NETWORKS PROXY | 2.40.175.6 | 32 | 1 |

IDENTIFYING NOTABLE EVENTS BASED ON EXECUTION OF CORRELATION SEARCHES

CROSS-REFERENCE TO RELATED APPLICATION

This application claims benefit under 35 U.S.C. § 120 as a continuation of U.S. application Ser. No. 14/135,427, filed Dec. 19, 2013, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to techniques for identifying, among other things, network addresses or IDs, which may be obtained from multiple sources (e.g., external sources, such as third-party providers), within network data, machine data, or events derived from network and/or machine data. In addition, the present disclosure relates to techniques for identifying notable events by searching events for the presence of network addresses and/or network IDs that are obtained from multiple external sources.

BACKGROUND

Enterprise organizations and the data analysts they employ face the challenge of finding useful information in the increasing amounts of data generated and collected by these organizations over time. Such "big data" may provide, for example, valuable insights into the organization's operational performance and business patterns associated with various parts of the organization. For example, accessing computer networks of a business enterprise and transmitting electronic communications across these networks generates massive amounts of data. Such data generated by machines may include, for example, Web logs of activity occurring at various web servers distributed across an enterprise's network.

Analysis of this data can indicate patterns in consumer behavior with respect to the particular products or brands in which consumers may be interested during a given period of time. Such pattern analysis also may be helpful in differentiating normal operational performance from anomalies. For example, the detection of unusual patterns can allow a system analyst to investigate the circumstances under which these unusual patterns emerged and determine whether any issues exist that may pose a threat to the system's operational performance or security. Moreover, analysis of such data allows business enterprises to understand how their employees, potential consumers, and/or Web visitors use the company's online resources. Such analysis can therefore provide businesses with operational intelligence, business intelligence, security intelligence, and a better overall ability to manage their information technology (IT) resources. For instance, such analysis may enable a business to better retain customers, meet customer needs, and improve the efficiency and security of the company's IT resources.

However, data analysts or systems administrators of an enterprise may encounter significant challenges when attempting to identify, collect, and analyze such large quantities of data, which may be distributed across multiple data sources within the enterprise's network environment or IT infrastructure. Such challenges may prevent these enterprise users from realizing the potential value that this data may provide. In particular, patterns in the enterprise's data as a whole, which may provide valuable insight into the operations of the enterprise, may be difficult to find due in part to the size of this data and the fact that the underlying data produced by each data source within the enterprise is usually analyzed in isolation, if at all.

The challenge of handling and analyzing large amounts of data may be particularly difficult in the context of operating a security management system. For example, a security information and event management ("SIEM") system typically enables real-time analysis of security-related events generated based on computing activity across an enterprise. A SIEM system may also provide analytical tools having a range of functions including trend analysis, event identification, and alerting. Despite having an implemented SIEM system, many enterprises continue to battle a host of security vulnerabilities in their IT systems as distributed computing systems are rapidly adopted and expanded by the enterprises. With an expansion of distributed computing systems comes additional security issues due to the addition of the new components and the communications between these components. Such changes may introduce new challenges for monitoring and analyzing security events based on activity occurring in the distributed computing systems. Often, a user of a SIEM system may be presented with large amounts of data relating to security events occurring in the system. Left with a difficult task of sorting through the data to identify significant or noteworthy events, the user faces an additional challenge of indicating or flagging certain events to distinguish them from other events. Users also have difficulty aggregating or updating information used to identify significant or noteworthy security events.

SUMMARY

Embodiments of the present disclosure relate to, among other things, a computer-implemented method comprising: receiving a plurality of lists of network locations, wherein each list is received from over a network, wherein each of the network locations includes a domain name or an IP address, and wherein at least two of the plurality of lists each include a same network location; aggregating the plurality of lists of network locations into a deduplicated list of unique network locations; and searching network data or machine data for a network location included in the deduplicated list of unique network locations.

Various embodiments of the method may include one or more of the following features: each of the network locations includes a domain name; each of the network locations includes an IP address; the network data or machine data is included in time-stamped searchable events; the network data or machine data is included in a set of time-stamped searchable events, and wherein searching the network data or machine data comprises using the deduplicated list of unique network locations to determine for each event in the set whether the event includes any network location in the deduplicated list of unique network locations; the network data or machine data is included in a set of time-stamped searchable events, and wherein searching the network data or machine data comprises using the deduplicated list of unique network locations to determine for each event in the set whether the event has as a value for a field identified in a query any network location in the deduplicated list of unique network locations; and the network data or machine data is derived at least in part from a log file generated by a server, a firewall, a router, an intrusion detection system, or an intrusion prevention system.

In some embodiments, the method further comprises: displaying an identification of a set of lists of network locations, wherein the plurality of lists of network locations that are aggregated into the deduplicated list of unique network locations are included in the set of lists and are aggregated based on their selection from the set of lists by a user; or receiving a user-generated list of network locations; and including the network locations in the user-generated list in the deduplicated list of unique network locations; or storing the deduplicated list of unique network locations in a lookup table; and executing a correlation search between the lookup table and events that include the network data or machine data; or determining that a set of one or more events derived from the network data or machine data includes the network location and meets other criteria specified by a query or correlation search; and based on the determination, generating a notable event or an alert Embodiments of the present disclosure also relate to, among other things: a system comprising: a memory having processor-readable instructions stored therein; and a processor configured to access the memory and execute the processor-readable instructions, which when executed by the processor configures the processor to perform a plurality of functions, including functions for: receiving a plurality of lists of network locations, wherein each list is received from over a network, wherein each of the network locations includes a domain name or an IP address, and wherein at least two of the plurality of lists each include a same network location; aggregating the plurality of lists of network locations into a deduplicated list of unique network locations; and searching network data or machine data for a network location included in the deduplicated list of unique network locations.

Embodiments of the present disclosure also relate to, among other things: a computer-readable medium storing instructions that, when executed by a computer, cause the computer to perform functions of a method of: receiving a plurality of lists of network locations, wherein each list is received from over a network, wherein each of the network locations includes a domain name or an IP address, and wherein at least two of the plurality of lists each include a same network location; aggregating the plurality of lists of network locations into a deduplicated list of unique network locations; and searching network data or machine data for a network location included in the deduplicated list of unique network locations.

It may be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIGS. 7-19 are screenshots of various exemplary visualizations and user interfaces for identifying network addresses and/or IDs of a deduplicated list among network data, machine data, and/or events derived from network data and/or machine data, consistent with embodiments of the present disclosure.

DETAILED DESCRIPTION

Overview

Figure 1:
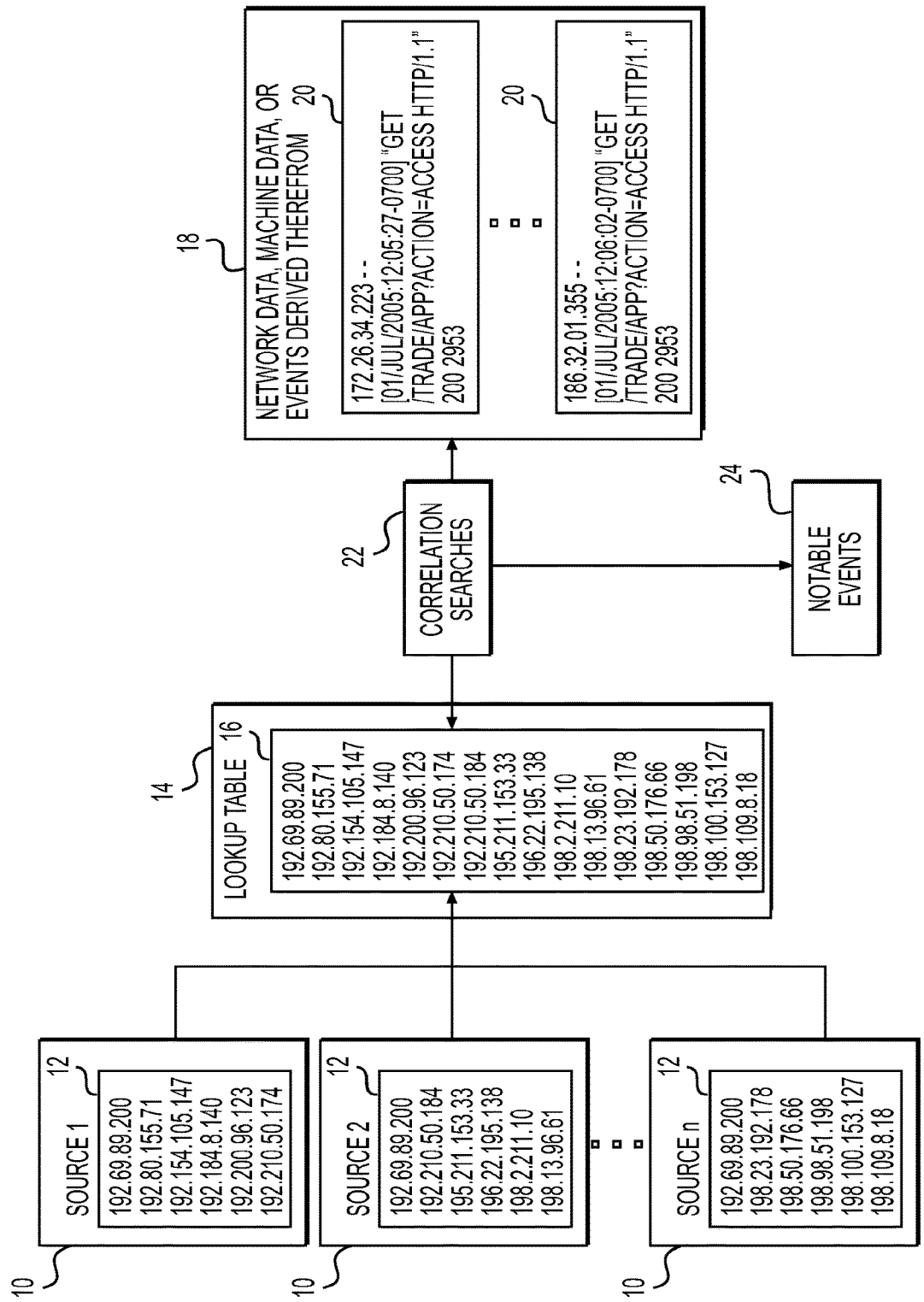
FIG. 1 is a high-level schematic diagram of an exemplary technique for identifying network addresses and/or IDs of a deduplicated list among network data, machine data, and/or events derived from network data and/or machine data, consistent with embodiments of the present disclosure.

The present disclosure relates to systems and methods for identifying network addresses and/or IDs of a deduplicated list among network data, machine data, and/or events derived from network data and/or machine data. In addition, embodiments of the present disclosure relate to techniques for identifying notable events found in network data or machine data, by searching events for the presence of network addresses and/or network IDs that are deduplicated across lists received from multiple external sources. For example, in certain embodiments, correlation searches may be performed to identify network traffic to/from potentially malicious entities based on "blocklists" downloaded from and aggregated across a plurality of third-party sites or sources. A "blocklist" (also referred to herein as a "threat list") may be any list of network addresses and/or identifiers for assets (e.g., machines), individuals, entities, domains, etc. that have been identified as being malicious, potentially malicious, or otherwise suspicious or undesirable.

Although the following discussion and several exemplary embodiments of the present disclosure are described in the context of network and/or machine data being segmented into events, the present disclosure is not and should not be limited to analysis of events. In particular, the present disclosure may involve comparing any network data, network traffic, database data, sensor data, or any other information to a deduplicated list of network addresses and/or network IDs aggregated from a plurality of sources (including, e.g., external sources and/or newly-added or user-generated sources).

Having said that, it should be appreciated that, in certain embodiments, the present disclosure may in some cases involve identifying network addresses and IDs of deduplicated lists in a variety of different types of so-called "events." For example, SPLUNK® ENTERPRISE, which is software produced and sold for on-premise and/or cloud use by Splunk Inc. of San Francisco, Calif., provides an exemplary system for generating, storing, and retrieving events. While SPLUNK® ENTERPRISE can turn almost any time series data into events of the type that can be analyzed and visualized by the methods of the present disclosure, it has gained particular appeal in the market for deriving events from particular kinds of data: unstructured data, machine data, and/or log data. It is the leading software for providing real-time operational intelligence, enabling organizations to collect, index, and harness the machine-generated big data coming from, among other sources, the websites, applications, servers, networks, mobile devices, and sensors that power their businesses.

At a high level, SPLUNK® ENTERPRISE may take raw data, unstructured data, or machine data such as a Web log, divide the data up into segments, and optionally transform the data in these segments to produce time-stamped events. The software derives the timestamp for each event by extracting it from the event data itself or by interpolating an event's timestamp relative to other events for which the software can derive a timestamp. SPLUNK® ENTERPRISE then stores the events in a time-series data store against which it can run queries to retrieve events having a certain keyword or meeting specified criteria.

In SPLUNK® ENTERPRISE, a query often uses a schema to specify criteria for events of interest. As noted, an event in SPLUNK® ENTERPRISE may contain an entire segment of raw data (or transformed version of such). A schema may include one or more fields, each of which may be defined for a subset of the events in the data store and each of which may be associated with an extraction rule specifying how to extract a value for the field from each of the subset of events for which the field has been defined. The extraction rule for a field is often embodied in a regular expression (e.g., a "regex" rule) or any other text extraction protocol/language. Frequently, a field is associated with a logical type of information that is contained within an event for which it is defined, and a field is frequently assigned a name associated with the type of information that appears in the field. A query often specifies the criteria for events of interest in terms of events having specified value(s) for specified field(s).

SPLUNK® ENTERPRISE is particularly noteworthy for employing a so-called late-binding schema. The term "late-binding schema" refers to a system, such as SPLUNK® ENTERPRISE, where the schema need not be defined at index time, as with database technology. Rather, in a system involving late-binding schema, the schema can be developed on an ongoing basis up until a query, during execution, applies (binds) the schema to data to evaluate the data. As a data analyst learns more about the data in stored events, in a late-binding schema, he/she can continue to develop the schema up until the next time it is needed for a query. Because SPLUNK® ENTERPRISE maintains the underlying raw data and enables application of a late-binding schema, as compared to databases or data systems that merely store summaries or portions of data, it has greater capability to enable deep exploration of the data to solve problems reflected in the data and answer questions about the data.

Splunk Inc. and third parties also produce a number of applications that run on top of the SPLUNK® ENTERPRISE platform. These applications may (1) provide additional functionality (including data visualizations) for particular SPLUNK® ENTERPRISE use cases, and/or (2) help define schema to make sense of data from particular sources to facilitate the use cases. One such application is the SPLUNK® APP FOR ENTERPRISE SECURITY, which, among other things, may provide additional functionality to assist in identifying computer and network security threats from the data ingested and stored by SPLUNK® ENTERPRISE. Besides providing functionality to help with schema creation for data coming from particular data sources popular in the computer and network security context, the SPLUNK® APP FOR ENTERPRISE SECURITY also provides unique visualizations to assist users in discovering security threats and tracking them as so-called "notable events."

A "notable event" can be generated in the SPLUNK® APP FOR ENTERPRISE SECURITY in two ways: (1) a data analyst may manually identify a group of two or more events as "notable" because of some correlation among the events that piqued the analyst's concern, where the manually identified set of events is the notable event, or (2) a data analyst may specify criteria that is met by a set of events, where the set of events that together meet the criteria is the notable event. Optionally, in this latter example, a data analyst may generate a query specifying the criteria for a notable event, and every time a set of events satisfies the criteria, the software generates a notable event; a query of this type may be referred to as a "correlation search." It will be appreciated that notable events generated using one or both of these techniques can be represented in a given visualization. As noted, the types of events to which the visualization methods of the present disclosure may be applied include any of the types of events or notable events generated by SPLUNK® ENTERPRISE and the SPLUNK® APP FOR ENTERPRISE SECURITY.

While utilizing events including raw data (or transformed raw data) may provide advantages, the events that can be identified using the methods of the present disclosure can also include any other logical piece of data (such as a sensor reading) that was generated at or corresponds to a fixed time (thereby enabling association of that piece of data with a timestamp representing the fixed time). Another exemplary source of events in the computer and network security space involves the kinds of events generated and analyzed by vendors in the SIEM field. These vendors produce software that competes with the SPLUNK® APP FOR ENTERPRISE SECURITY.

SIEM vendors have a significant disadvantage. Their software neither retains the entire underlying raw data nor employs a late-binding schema. Rather, at index time, raw data may be divided into segments and a timestamp derived, as in SPLUNK® ENTERPRISE. But these raw data segments are then processed to extract values for a limited set of fields that are defined for each segment prior to index time. In a method referred to as data reduction, SIEM software then discards the underlying raw data once values have been extracted for the fields that were defined prior to index time. If it becomes important to look at underlying data later as data issues are discovered, SIEM software cannot provide that capability. Nonetheless, each set of values for fields extracted from a given timestamped segment may comprise a timestamped event.

Analogous to the notable events of SPLUNK® APP FOR ENTERPRISE SECURITY, SIEM software may generate so-called "alerts" when a set of their data reduced events are manually identified or together meet specified criteria (such criteria may be defined by a so-called "rule"). The events that the methods of the present disclosure may help to identify include the kinds of data-reduced events and alerts that are produced by SIEM software.

While the present disclosure is described herein with reference to illustrative embodiments for particular applications, it should be understood that embodiments are not limited thereto. Other embodiments are possible, and modifications can be made to the embodiments within the spirit and scope of the teachings herein and the additional fields in which the embodiments would be of significant utility.

It should also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments, whether or not explicitly described.

In an embodiment, "time-series data" and "time-series machine data" may include, among other things, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. Unstructured data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. As will be described in further detail below, the visualization of such time-series data may be used to display statistical trends over time. The time-series machine data collected from a data source may be segmented or otherwise transformed into discrete events, where each event can be associated with a timestamp.

In an embodiment, an "event" may include a single record of activity from a particular data source associated with a single timestamp. Such an event may correspond to, for example, one or more lines in a log file or other data input. Further, "events" may be derived from processing or indexing machine data, as described elsewhere, or may include the other kinds of events or notable events described elsewhere. Events can also correspond to any time-series data, such as performance measurements of an IT component (e.g., a computer cluster, node, host, or virtual machine), or a sensor measurement.

In an example, a field extractor within an enterprise network environment may be configured to automatically identify certain fields in the events while the events are being created, indexed, or stored. Alternatively, fields can be identified and added to a schema by a user using a variety of techniques. Additionally, fields that correspond to metadata about the events, such as a timestamp, host, source, and source type for an event, may also be created; such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

In one embodiment, systems and methods are disclosed for monitoring and identifying network addresses or identifiers included in data and/or events in a SIEM system or a similar system. As described above, these systems and methods may improve efficiency for identifying events that are related to a potential security threat requiring further investigation. The events may be based on computer activity including access control to a system, activity at an endpoint in a system, and/or network activity.

In one embodiment, data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, and sensors. The types of data generated by such data sources may be in various forms including, for example and without limitation, server log files, activity log files, configuration files, messages, network packet data, performance measurements or metrics, and/or sensor measurements.

To facilitate identification of security-related events (e.g., events that may be relevant to computer or network security), the disclosed system may perform further processing on timestamped events to identify events having information related to computer or network security. The timestamped stored events may include information related to computer security or network security, such as network information (e.g., an IP address, domain, asset ID, identity ID, HTTP agent strings, network traffic size, a length of a uniform resource locator string, byte count per request, domain names, or a source address), access control information (e.g., login/logout information or access failures), or endpoint information (e.g., malware infections, system configurations, or system states). The information related to computer or network security may include any information that is useful for analysis of the timestamped event to identify a potential issue with security. Field values may be extracted from the timestamped events, and then searched for the security information to identify security related events.

The events identified based on the security information may be grouped together based on one or more fields in each of the events satisfying a criteria for a group of security-related events. The criteria may be defined based on one or more fields that contain information indicative of a potential security threat. A group of security-related events that include these fields may be useful for identifying a source of such malicious activity. Thus, groups of security-related events may indicate a relationship of events that are related to a type of security issue.

The data sources may be associated with, for example, an enterprise data system distributed across a network environment. The events, which may be derived from indexing or segmenting the machine data, network data, or other data generated by these data sources, may be used to provide search and data analysis functionality to a user of the enterprise data system, e.g., a data analyst or systems engineer interested in gaining a better understanding of the performance and/or security of an enterprise organization's IT infrastructure.

As described in greater detail below, the events for which security event identification methods are provided herein can include any or all of the following: (1) timestamped segments of raw data, unstructured data, or machine data (or transformed versions of such data); (2) the kinds of events analyzed by vendors in the SIEM field; (3) any other logical piece of data (such as a sensor reading) that was generated at or corresponds to a fixed time (thereby enabling association of that piece of data with a timestamp representing the fixed time); and (4) occurrences where a set of any of the foregoing types of events either meets specified criteria or was manually selected by a data analyst as notable (a "notable event") or a cause for an alert (the SIEM equivalent of a notable event).

EXEMPLARY EMBODIMENTS

FIG. 1 depicts a schematic representation of one exemplary embodiment of the present disclosure. In general, the present disclosure relates to obtaining a plurality of "blocklists," each of which may include any list of network addresses or identifiers of malicious, potentially malicious, or otherwise suspicious or undesirable entities or machines accessible over the Internet. For example, in one embodiment, the present disclosure may involve receiving a blocklist 12 from each of a plurality of external, third-party sources 10 (e.g., Source 1, Source 2, . . . Source n), such as by downloading a blocklist 12 from a website operated by each of the external, third-party sources. In one embodiment, each blocklist 12 may include a list of IP addresses, domains, network IDs, asset IDs, identity IDs, advertising IDs, or any other address or identifier of a malicious or potentially malicious entity. The present disclosure may involve downloading a blocklist 12 from each of a plurality of sources 10 on a regular basis, such as according to an interval defined in a configuration file, or on an irregular basis, such as when prompted by a user or when updated blocklists 12 become available at respective sources 10. In one embodiment, each blocklist 12 may be a comma-separated value (CSV) file with the expected format of "is ip,description,is_type."

As indicated with respect to the exemplary screenshots described below, each blocklist 12 may alternatively or alternatingly be referred to as a "threat list," given that it may contain IP addresses or other identifiers of entities considered malicious, harmful, or otherwise undesirable. In some cases, an administrator of an IT or enterprise environment may implement each blocklist as a filter, thereby preventing people and machines within the environment from accessing, receiving content from, or granting access to, any machine located at one of the IP addresses in one or more of the blocklists 12. Alternatively or additionally, each blocklist 12 may be implemented as an identifying cross-reference for tracking and monitoring access and/or requests to any machine located at one of the IP addresses in one or more of the blocklists 12.

As shown in FIG. 1, the present disclosure may involve aggregating and deduplicating the network addresses or IDs included among the blocklists 12 received from the plurality of sources 10. In one embodiment, the addresses or IDs may be deduplicated and stored in a lookup table 14 as an aggregated, deduplicated list 16. The network addresses or IDs received in the plurality of blocklists 12 from the plurality of sources 10 may be aggregated and deduplicated using any desired technique, but may preferably be deduplicated using a technique that minimizes computational load and time to generate a deduplicated list 16.

The present disclosure may also involve executing a query or a correlation search 22 on network data, machine data, and/or events derived from network and/or machine data, using the deduplicated list 16 stored in lookup table 14. Because the addresses and/or IDs received in the plurality of blocklists 12 are aggregated or otherwise collapsed or reduced into the deduplicated list 16 stored in lookup table 14, a query or correlation search 22 that leverages the deduplicated list 16 has the capability of identifying data referencing addresses and/or IDs from the plurality of blocklists 12 without the overhead of comparing the data to the duplicate addresses and/or IDs from the various blocklists 12. The various blocklists 12 may be updated at different times (such as after a given time interval or upon receipt of an indication that one of the blocklists 12 has been updated), and an updated deduplicated list 16 may be created at various times as well (such as when a new or updated blocklist 12 has been received or prior to execution of a query or correlation search).

While many of the embodiments discussed herein involve executing correlation searches on the data to identify data or events that include network addresses or IDs in the deduplicated list 16, correlation searches typically involve looking for a set of one or more events that together meet specified criteria, and the result of a correlation search typically involves identifying a notable event. More generally, embodiments may include running a query on data or events to identify data containing network addresses or IDs in the deduplicated list 16, events containing network addresses or IDs in the deduplicated list 16, or events having as a value of a specified field network addresses or IDs in the deduplicated list 16. The output of such a query need not be a notable event but could be any type of query result.

As shown in FIG. 1, in one embodiment, the disclosed techniques may involve using queries or correlation searches 22 to analyze collected network data or machine data 18. In one embodiment, the disclosed techniques may involve using correlation searches 22 to analyze events 20 that are derived from collected network data or machine data 18. In one embodiment, any of the events 20 having a field value matching an address or ID present in the deduplicated list 16 stored in lookup table 14 may be flagged or otherwise identified as being a "notable event" 24. As will be described in more detail below, a notable event 24 may be a set of one or more events together satisfying a criteria (e.g., the presence of an IP address or destination IP address stored in deduplicated list 16).

As will be described in further detail below, in certain embodiments, the collected network data, machine data, or other data 18 may be indexed and/or segmented into a set of timestamped events representing, for example, operations, transactions, records, measurements, or readings generated at each of a plurality of data sources over a period of time. In one embodiment, for example, one of the data sources may be a web server, and the timestamped events may correspond to entries within a log file generated by the web server over a given time period. The events in this example may correspond to, for example and without limitation, requests and responses related to web content to and from the web server and one or more computing devices associated with end-users of a service provided by the web server, e.g., via one or more web pages that may be loaded into a web browser executable at each end-user's device. The requests and responses may be in the form of, for example and without limitation, standard Hypertext Transfer Protocol (HTTP) requests and responses between the web server and each end-user's device. Other examples of events that may be derived from log files or other types of machine data generated by a data source include, but are not limited to, the execution of a program or script, a fault exception, an unhandled interrupt, and any security threats or other potential issues detected during the period of time. Further, an individual event may be derived from machine data corresponding to, for example, a single line of machine data within an activity log, multiple lines of machine data, a whole document, an entire configuration file, or a complete stack trace generated by the data source.

It should be appreciated that, although the foregoing discussion and several exemplary embodiments are described in the context of network and/or machine data being segmented into events, the present disclosure is not and should not be limited to events. In particular, the present disclosure may involve comparing any network data, network traffic, database data, or any other information to a deduplicated list of network addresses and/or network IDs aggregated from a plurality of sources, including but not limited to external sources or third-party providers.

Figure 2:
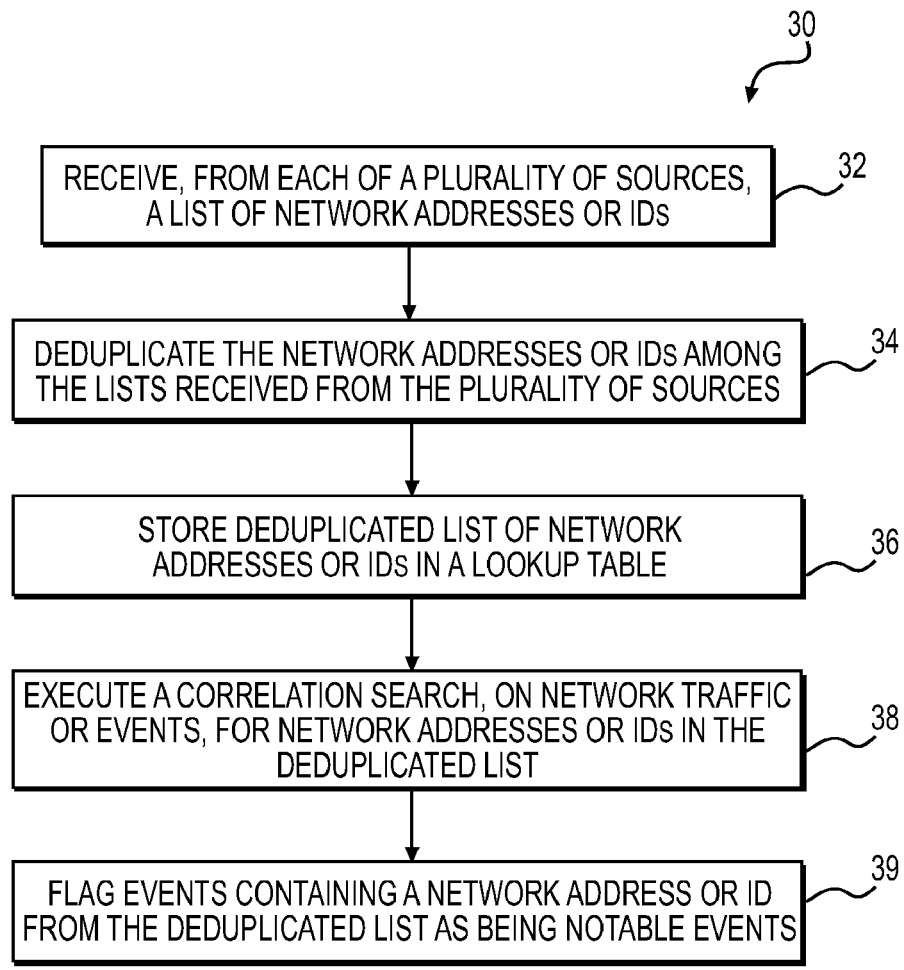
FIG. 2 is a high-level flowchart of an exemplary method for identifying network addresses and/or IDs of a deduplicated list among network data, machine data, and/or events derived from network data and/or machine data, consistent with embodiments of the present disclosure.

To that end, FIG. 2 describes one exemplary method of the present disclosure. Specifically, FIG. 2 depicts a flow chart of an exemplary method 30 for comparing any network data, network traffic, database data, or any other information to a deduplicated list of network addresses and/or IDs aggregated from a plurality of sources. Method 30 may begin by receiving, from each of a plurality of sources, a list of network addresses and/or IDs (step 32). In one embodiment, the sources may be external sources, i.e., operated by an entity separate from an entity practicing method 30, and the list of network addresses and/or IDs may be obtained over the Internet. In another embodiment, the sources may be internal, i.e., accessible to the entity practicing method 30, and may be obtained from a user input or through access to a database or other store accessible to the entity practicing method 30. In one embodiment, the lists of network addresses and/or network IDs, whether obtained internally or externally, may be embodied in CSV files, or any other similar or equivalent file structure. Furthermore, the list(s) of network addresses and/or network IDs may be or may include lists generated by a user or other entity practicing method 30.

Method 30 may further include deduplicating the network addresses and/or IDs among the lists received from the plurality of sources (step 34). For example, in one embodiment, the list from each source may have been stored in its own lookup table. The network addresses and/or IDs among the lists may be deduplicated, aggregated, merged, or collapsed in any desired way that achieves the desired result of a list of only unique network addresses and/or IDs. For example, deduplication may achieve a result of one list of network addresses and/or IDs, with the list including exactly one of each of the network addresses and/or IDs received from any of the sources, and with no duplicated network addresses and/or IDs. By way of example, the network addresses and/or IDs may be deduplicated using data chunking, sliding-window chunking, hash functions, or any other known method.

Method 30 may further include storing the resulting deduplicated list of network addresses and/or IDs in a lookup table (step 36). The deduplicated list of network addresses and/or IDs may be stored in any other desired data store, database, index, or any other memory type.

Method 30 may further include executing a correlation search on network traffic or events, for any network addresses and/or IDs in the deduplicated list (step 38). For example, method 30 may involve searching any network traffic, network data, or any other data or events, for data elements or events containing network addresses and/or IDs that are also stored in the deduplicated list. In one embodiment, a correlation search may be a query of raw data or events with reference to the aggregated network addresses and/or IDs stored in the lookup table. In one embodiment, a correlation search may involve the generation of a query, of the type disclosed in more detail below, such as with respect to queries of events having certain fields. In one embodiment, by way of example, if a blocklist is named "ip_rfc1918.csv", the search string for a new correlation search might include:

|'src_dest_tracker'|lookup local=true ip_rfc1918_lookup src OUTPUTNEW src_ip as src_rfc1918_ip, src_is_rfc1918|lookup local=true ip_rfc1918_lookup dest OUTPUTNEW dest_ip as dest_rfc1918_ip, dest_is_rfc1918|search dest_is_rfc1918=true OR src_is_rfc1918=true|eval rfc1918_ip=if (dest_is_rfc1918=="true",dest_rfc1918_ip,rfc1918_ip)|eval rfc1918_ip=if(src_is_rfc1918=="true",src_rfc1918_ip, rfc1918_ip)|fields+sourcetype,src,dest,rfc1918_ip Method 30 may further include flagging any data elements or events (or a set of events) containing a network address and/or ID from the deduplicated list as being a notable event (step 39). Again, it should be appreciated that, although the flagged data elements or events (or a set of events) may be flagged as a "notable event," it should be appreciated that the technique is also applicable to events in systems, such as SIEM systems, that do not use the term "notable event." For example, method 30 may be applicable to the generation of "alerts" based on any pre-determined "rules" for flagging events in SIEM systems as containing network addresses and/or IDs listed in a deduplicated list compiled from a plurality of sources. Likewise, the techniques in this disclosure could be applied to data not in the form of events to identify data referencing the network addresses and/or IDs listed in a deduplicated list compiled from a plurality of sources.

Figure 3:
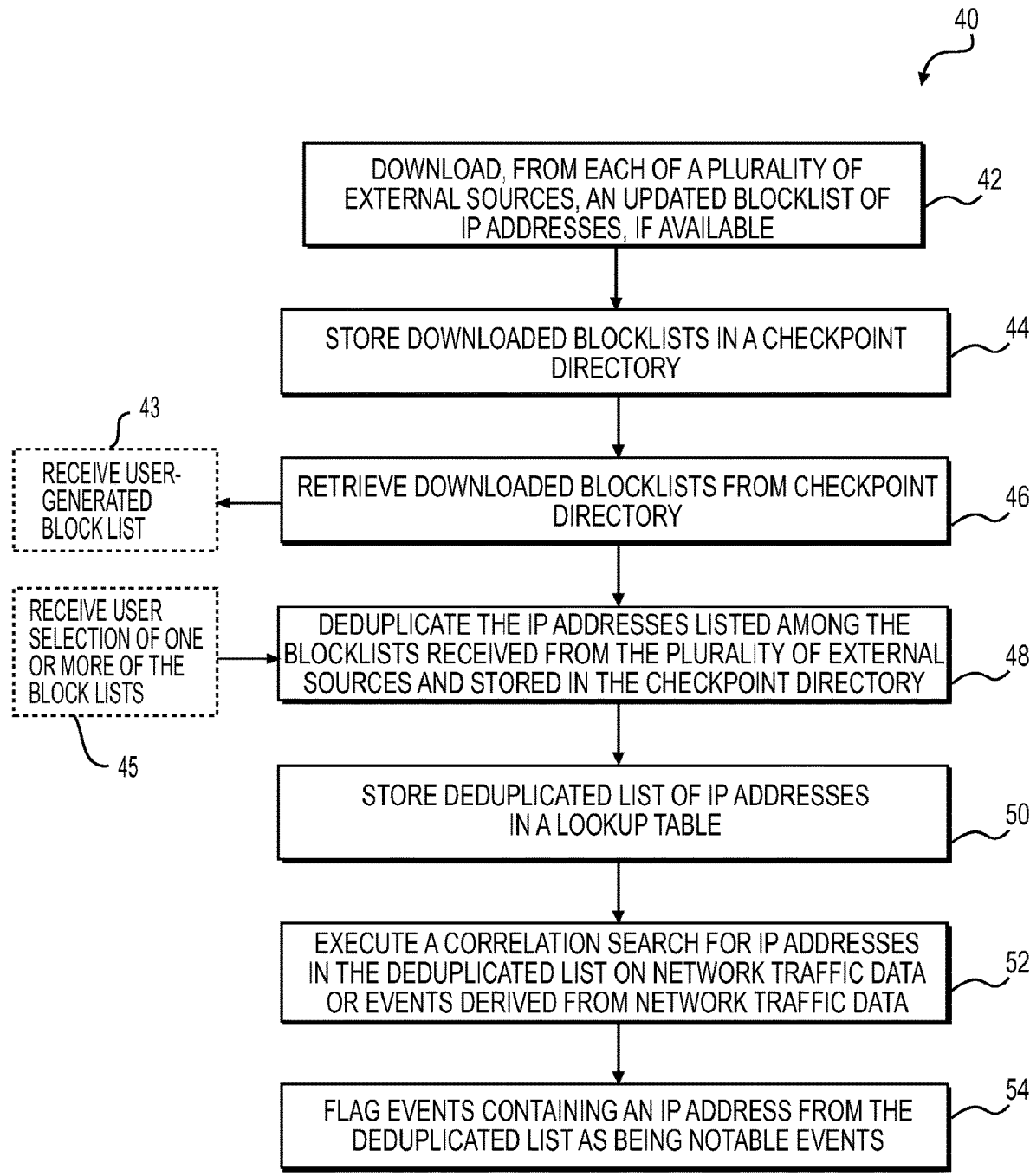
FIG. 3 is a high-level flowchart of an exemplary method for identifying network addresses and/or IDs of a deduplicated list among network data, machine data, and/or events derived from network data and/or machine data, consistent with embodiments of the present disclosure.

FIG. 3 depicts another exemplary method for comparing any network data, network traffic, database data, or any other information to a deduplicated list of network addresses and/or IDs aggregated from a plurality of sources. Specifically, FIG. 3 depicts a flow chart of an exemplary method 40 for comparing any network data, network traffic, database data, or any other information to a deduplicated list of network addresses and/or IDs aggregated from a plurality of sources. Method 40 may begin by downloading, from each of a plurality of external sources, an updated blocklist of IP addresses, if available (step 42). In one embodiment, the external sources may be operated by an entity separate from an entity practicing method 40. In one embodiment, the blocklists of IP addresses may be embodied in CSV files, or any other similar or equivalent file structure. Moreover, in one embodiment, the blocklists may be downloaded from the external sources only when an updated blocklist is available. In other words, step 42 may include, e.g., automatically or selectively checking a website operated by the external entity to determine if a blocklist maintained by that external entity has been updated since the last time it was downloaded.

Method 40 may further include storing the downloaded blocklists in a checkpoint directory (step 44). Method 40 may further include retrieving the downloaded blocklists from the checkpoint directory (step 46), and deduplicating the IP addresses listed among the blocklists received from the plurality of external sources and stored in the checkpoint directory (step 48). In one embodiment, the IP addresses may be deduplicated in real-time, or at least at periodic intervals of time, where the interval may be set by a user or administrator. Alternatively, or additionally, the IP addresses may be deduplicated at least upon any addition of a new blocklist or "threat list" to an existing set of blocklists, or any update to an existing blocklist or "threat list." In one embodiment, the one or more blocklists received from each source may have been stored in its own lookup table or in a combined lookup table of the checkpoint directory. The IP addresses among the blocklists may be deduplicated, aggregated, merged, or collapsed in any desired way that achieves the desired result of a list of only unique IP addresses. For example, deduplication may achieve a result of one list of IP addresses, with the list including exactly one of each of the IP addresses received from any of the sources, and with no duplicated IP addresses. By way of example, the IP addresses may be deduplicated using data chunking, sliding-window chunking, hash functions, or any other known method.

As shown in FIG. 3, in one embodiment, method 40 may include receiving a user-generated blocklist (step 43). For example, as will be described in more detail with respect to the screenshots herein, a user may manipulate a user-interface of the presently-disclosed system to create a new list of IP addresses or other network identifiers that form a new, user-generated blocklist. Moreover, in one embodiment, method 40 may include receiving a user's selection of one or more of the available blocklists, e.g., the blocklists received from each of the plurality of external sources and/or generated by a user (step 45). For example, as will be described in more detail with respect to the screenshots herein, a user may manipulate a user-interface of the presently-disclosed system to selectively enable or disable each of the blocklists received from each of the plurality of external sources and/or generated by the user, for comparison to network data, machine data, and/or events derived therefrom. It should be appreciated that the user may in some cases both generate a user-generated blocklist (consistent with step 43), and selectively enable a desired one or more of the third-party blocklists (consistent with step 45), for aggregation into a single aggregated blocklist. Alternatively, the user may perform only one of the user-generated blocklist and user-selected blocklists, for aggregation into a single aggregated blocklist.

Method 40 may further include storing the resulting deduplicated list of IP addresses in a lookup table (step 50). The deduplicated list of IP addresses may be stored in any other desired data store, database, index, or any other memory type. Again, the deduplicated list of IP addresses may be deduplicated in real-time, or at least every interval of time, where the interval is set by a user or administrator. Alternatively, or additionally, the deduplicated list may be deduplicated at least upon any addition of a new blocklist or "threat list" to a set of blocklists, or any update to an existing blocklist or "threat list." In one embodiment, the deduplicated list of IP addresses may be stored as a CSV file in a lookup directory on a search head (e.g., the $SPLUNK_HOME/etc/apps/SA-ThreatIntelligence/lookups directory on the Enterprise Security search head), in order to be used with a correlation search.

Method 40 may further include executing a correlation search on network traffic data or events derived from network traffic data, for any IP addresses in the deduplicated list (step 52). For example, method 40 may involve searching any network traffic, network data, or any other data or events, for data elements or events containing one or more IP addresses that are also stored in the deduplicated list. In one embodiment, method 40 may involve searching any network traffic, network data, or any other data or events, for data elements or events listing one or more of the IP addresses as a destination IP address. As described above, in one embodiment, the execution of a correlation search on the network traffic data or events derived from network traffic data may include the generation and execution of a query on the underlying data and/or the events derived from the underlying data, the query being a search for any IP addresses in the deduplicated list stored in the lookup table.

Method 40 may further include flagging any data elements or events containing one or more of the IP addresses from the deduplicated list as being a notable event (step 54). Again, it should be appreciated that, although the flagged data elements or events may be flagged as notable "events," the technique is applicable to any data elements, including those that are not considered "events." Likewise, the technique is applicable to events in systems that do not use the term notable events, such as SIEM systems, so that method 40 may be applicable to the generation of "alerts" based on any pre-determined "rules" for flagging any network and/or machine data as containing network addresses and/or IDs listed in a deduplicated list compiled from a plurality of sources.

Figure 4:
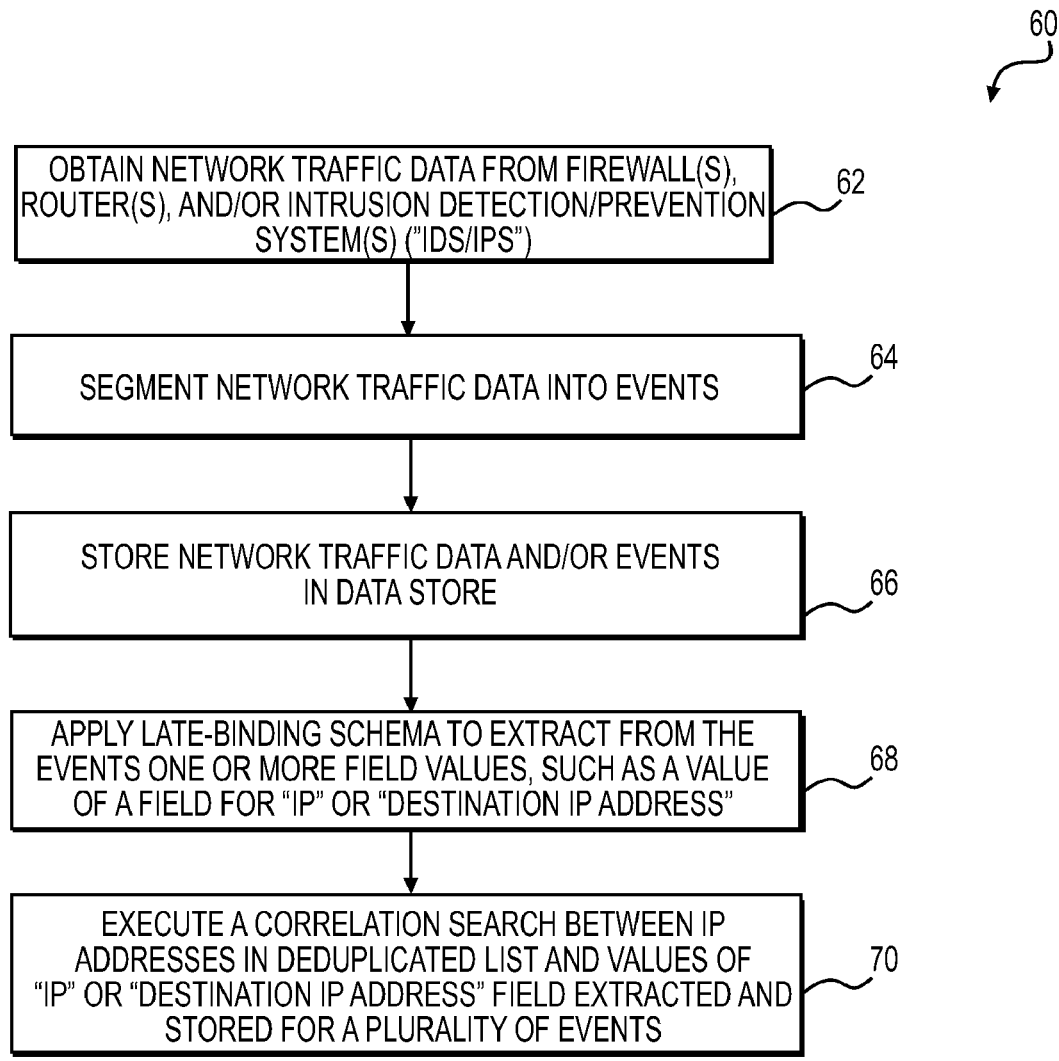
FIG. 4 is a high-level flowchart of an exemplary method for identifying network addresses and/or IDs of a deduplicated list among events derived from network data and/or machine data, consistent with embodiments of the present disclosure.

FIG. 4 illustrates a process flowchart of an exemplary method 60 for collecting, segmenting, and storing machine and/or network data collected from various data sources, for use in comparison to a deduplicated list of IP addresses aggregated from multiple sources. In this embodiment, data may be segmented into events. Method 60 may begin with receiving data generated by one or more sources. For example, as shown in the embodiment of FIG. 4, method 60 may begin with obtaining network traffic data from one or more firewall(s), router(s), and/or intrusion detection/prevention system(s) ("IDS/IPS") (step 62). Regardless of its source, the obtained data may include, and/or be referred to as, machine data (e.g., log files) or other computer data, network data, and/or mobile device data, including, but not limited to, access data, request data, log data, security information, measurements relating to the performance of an IT or network infrastructure component (e.g., a computer cluster, host, node, or virtual machine) or those captured by a sensor device within a distributed network environment (e.g., an enterprise network environment). In one embodiment, the data may be received from one or more forwarding devices or forwarders.

In one embodiment, as shown in the embodiment of FIG. 4, the received network traffic data may be segmented or transformed into events (step 64). In one embodiment, the events may be segmented according to one or more event boundaries that may be found within the received data. Examples of such event boundaries include, but are not limited to, predefined characters or character strings. These may include certain punctuation marks or special characters including, for example, carriage returns, tabs, spaces, or line breaks. In some instances, event boundaries may be discovered automatically by the software, and in other instances, they may be configured by the user.

In one embodiment, a timestamp may be determined for each event. The timestamp may be determined by extracting a time field from data in an event or by interpolating the time based on timestamps extracted from other events occurring shortly before or after the event within a particular time frame of activity associated with the same data source. In some implementations, the timestamp for an event may correspond to the time the event data was received or generated. The timestamp determined for each event may be associated with the event, such as by being stored as metadata for the event. Moreover, the data included in a given event may be optionally transformed. Such a transformation may include, for example, removing part of an event (e.g., a portion used to define event boundaries) or removing redundant portions of an event. A user or client may specify a portion to remove using a regular expression or other type of input provided via an interface of the data intake and query system described herein.

In one embodiment, any one or more of the received traffic data and/or events may be stored in one or more data stores (step 66). In one embodiment, the data also may be stored in a working, short-term, and/or long-term memory in order to decrease query execution time. A timestamp may be stored along with each event to help optimize searching the events by time range, and to help optimize time based searches by allowing events with recent timestamps that may have a higher likelihood of being accessed to be stored at preferable memory locations that lend to quicker subsequent retrieval (such as flash memory instead of hard-drive memory). In one embodiment, the data stores may be distributed across multiple indexers, where each indexer may be responsible for storing and searching a subset of the events generated within an enterprise environment. In some implementations, the stored event data may be distributed among indexers so as to enable parallel searching of events in response to a query initiated by a user or client within an enterprise network environment. As will be described in further detail below, partial query results returned by each of the indexers may be combined by a search head in order to produce a complete set of results in response to the user's query.

Also, as will be described in further detail below, a visualization system of the enterprise network environment may provide various GUIs enabling the user to initiate different queries and receive a representation of a subset of events occurring within a time range of interest and having a field of interest. In one embodiment, a field of interest may be a network address and/or ID contained within textual data of each event. More specifically, in one embodiment, a field of interest may be an IP address, such as a destination IP address, included within textual data of each event. In other words, the field of interest may be an IP address that a user within the enterprise may access or attempt to access, and the IP address may be of interest for comparison to one or more of the deduplicated lists (e.g., aggregated from multiple external sources) discussed above with respect to FIGS. 1-3. Accordingly, method 60 may further include extracting from the events one or more field values, such as a value of a field for "IP address" or "destination IP address" (e.g., "IP," "DEST," or "DESTIP"). In particular, as shown in the embodiment of FIG. 4, method 60 may include applying a late-binding schema to extract from the events one or more field values, such as a value of a field for "IP address" or "destination IP address."

The extraction of values of fields from data or events, such as according to a late-binding schema, will now be described in greater detail. In some implementations, the data management system of the enterprise network environment in this example may employ a specialized type of schema, referred to above as being a "late-binding schema." The term "late-binding schema" as used herein may refer to a system in which the schema need not be defined or applied at the time of indexing or storing the collected data, as typically occurs with conventional database technology. Rather, in a system using a late-binding schema, the schema can be developed on an ongoing basis up until the time it needs to be applied, e.g., at query or search time. In a query system using a late-binding schema, the query may specify, for example, a search for events that have certain criteria defined by the schema for specified fields and the events including such fields. At search time, the values for the specified fields may be extracted and compared to the search criteria. An advantage of such a late-binding schema may include enabling a user, e.g., a data analyst, to perform data analysis in order to learn more about data included within events indexed from collected machine data, while also allowing the user to continue developing the schema until, for example, it is needed again for executing a subsequent query to locate data within events.

Thus, in an example, the field selected by the user may be extracted from the events at search time, e.g., at the time a query including one or more search commands (e.g., in a search pipeline) is executed for a late-binding schema, as described above and as will be described in further detail below. Such a search-time field extraction may be based on, for example, a field definition or configuration specified by the user via an interactive field extraction functionality accessible through the GUI, through regular expressions included within a configuration file accessible to the data intake and query system, or through a search command provided as part of the query itself. In some implementations, the user may specify the field via an input control element provided by the GUI, e.g., by selecting a desired field from a list of fields extracted from the events and prepopulated within a menu, dropdown window, or other type of control element for field selection, as provided by the GUI for a particular implementation. The list of fields may also include, for example, any default fields and/or user-defined fields that have been defined for the events.

In one embodiment, a set of default or predefined fields may be extracted from the events or determined from metadata about the events. Other fields may be defined and included in the schema for the events at any time, up to and including search time. Examples of default fields corresponding to event metadata include, but are not limited to, host, source, source-type, and time (e.g., based on the timestamp for the event), as described above. In another example, a value for a field may be extracted from an event at search time, and the schema in this example may be referred to as a late-binding schema, as mentioned above and as will be described in further detail below. The extraction rule for a field may include a regular expression (e.g., "regex" or "regexp"), or any other expression or rule for how to extract a value from an event. In some implementations, the visualization system may provide the user with an interactive field extraction functionality via the GUI, which enables the user to create new custom fields.

In one exemplary embodiment, the events may be identified by executing a query for events including the particular field of interest (e.g., an IP address). As described above, a set of events may be derived from data collected from one or more data sources within an enterprise network environment (e.g., enterprise network environment 100 of FIG. 5, as described below) and processed by a security monitoring system 150 within the enterprise network environment. In some implementations, a data collector 205, such as a forwarder, may collect data for the data management system 222 and forward it to the data management system. The data management system 222 (described in FIG. 6) may include multiple indexers and multiple data stores distributed across the indexers. Each indexer may be responsible for indexing and storing at least a portion of the set of events derived from the data collected from the data sources, as described above. The indexers may also be utilized by a search head (e.g., search head 220 of FIG. 6) to execute a query (e.g., including a series of search commands in a search pipeline) for events including the field value (e.g., destination IP address). By distributing the search process amongst the various indexers, e.g., which may be able to search for events responsive to a query in parallel, the search head can utilize the indexers to execute the query and obtain query results in a shorter amount of time. It should be noted that the indexers might use any conventional or proprietary search technique for executing the query. Also, as each indexer may store only a portion of the entire set of events and thus, produce only a partial set of search results in response to the query, the search head may be configured to combine the partial results from each indexer in order to form a complete or final set of search results in response to the query.

In one embodiment, a search head may receive a query for events including a value of a specified field (e.g., "IP," "IPDEST," or "DEST", as described above). The query may be based on, for example, a correlation search or any input received from a user via a GUI or other interface of a client application executable at the user's device, as described above. In an example, the input from the user may be used by the client application to generate a search request that is sent to the search head for events including a particular field and/or a particular field/value pair. In one embodiment, the search head may distribute the received query or search request to one or more distributed indexers. These indexers can include those with access to data stores having events responsive to the query. The events may be indexed and stored within one or more data stores. For example, the indexers can include those with access to events with timestamps within a part or all of a time period identified in the query. In one embodiment, each of the one or more indexers to which the query may be distributed searches its data store for events responsive to the query. To determine events responsive to the query, a searching indexer may find events specified by the criteria in the query. Such criteria can include an indication that the events being queried have particular keywords or contain a specified value or values for a specified field or fields. As a late-binding schema may be used, as described above, extraction of values from events based on the specified criteria may occur at the time that the query is processed, e.g., as opposed to the time that the machine data is stored, indexed, or segmented into events. It should be appreciated that, to achieve high availability and to provide for disaster recovery, events may be replicated in or across multiple data stores, in which case indexers with access to the redundant events would not respond to the query by processing the redundant events. The indexers may either stream the relevant events back to the search head or use the events to calculate a partial result responsive to the query and send the partial result back to the search head. In one embodiment, the search head may be configured to combine all the partial results or events received from the parallel processing together to determine a final result responsive to the query.

FIGS. 2-4, as described above, illustrate various exemplary process flowcharts of exemplary methods for identifying network addresses or IDs, which may be obtained from multiple sources (e.g., external third-party providers), within network data, machine data, or events derived from network or machine data. Although the principles of the present disclosure contemplate that steps of methods 30, 40, and 60 may be performed in the order depicted in FIGS. 2-4, it should be appreciated that one or more of these steps may be performed in a different order or may be omitted altogether. Furthermore, it should be appreciated that methods 30, 40, and 60 may include additional steps than those shown in FIGS. 2-4, e.g., as desired or needed for a particular implementation. Methods 30, 40, and 60 will now be described in the context of an exemplary enterprise network environment 100 of FIG. 5, including a security monitoring system 150 (including data management system 152 and security identifying system 154) and the exemplary security monitoring system 200 of FIG. 6, for purposes of discussion (although methods 30, 40, and 60 are not intended to be limited thereto).

Figure 5:
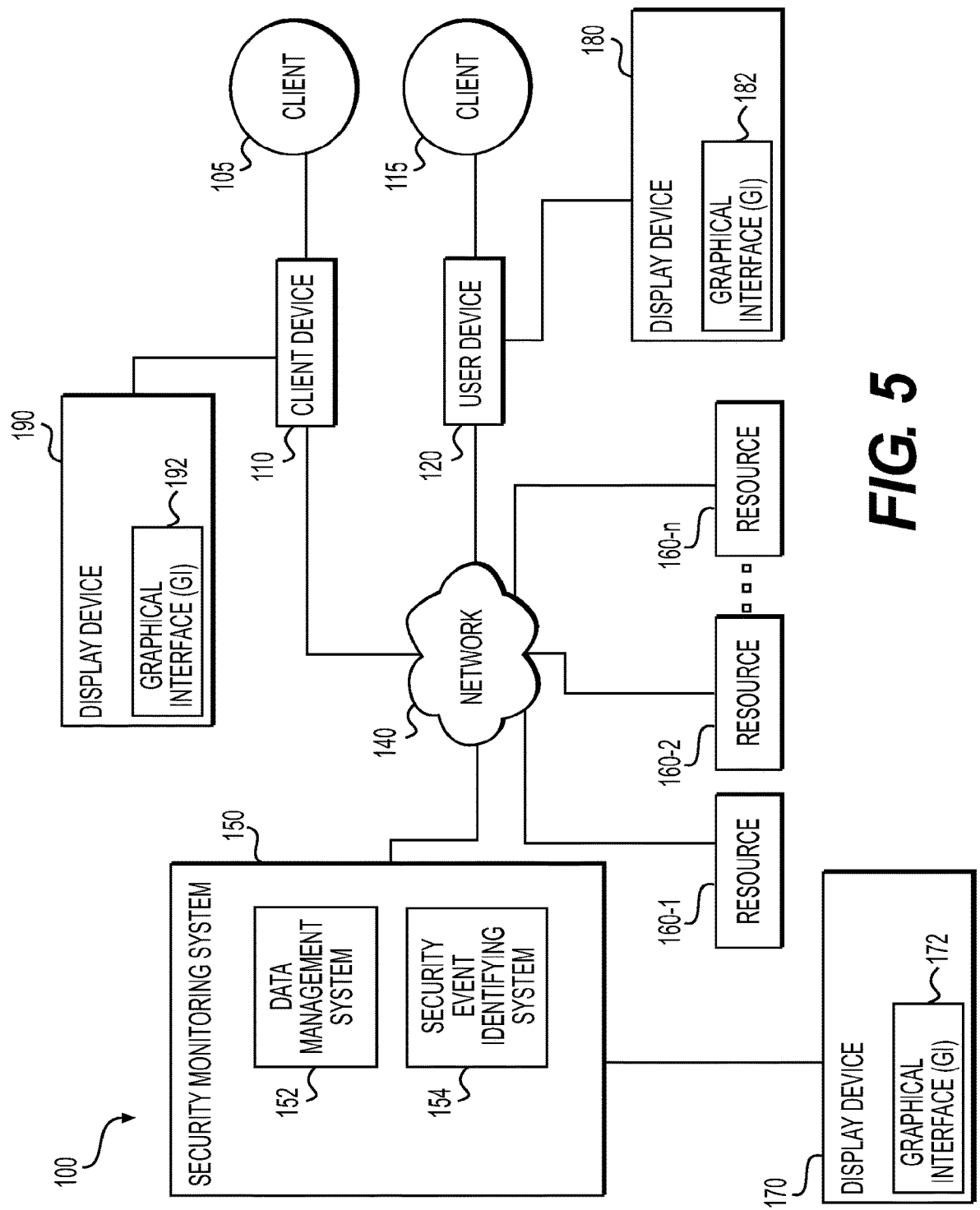
FIG. 5 is a high-level block diagram of an exemplary enterprise environment and system for identifying network addresses and/or IDs of a deduplicated list among network data, machine data, and/or events derived from network data and/or machine data, consistent with embodiments of the present disclosure.

Referring now to FIG. 5, a block diagram is shown illustrating an embodiment of a security event management and enterprise network environment 100. Those of skill in the art will appreciate that other embodiments of the present disclosure include systems having architecture varying from precisely that which is shown in FIG. 5. In a particular embodiment, the security event management environment 100 may be included in a SIEM system. In other embodiments, the security event management environment 100 may include or implement a security event management (SEM) system.

In one embodiment, the environment 100 may include one or more devices, such as a client device 110 and a user device 120 operated by a client 105 and a user 115, respectively. The client 105 and/or the user 115 may interact with a security monitoring system 150 via a network 140 using respective devices 110 and/or 120. In at least one embodiment, the network 140, may include a local area network (LAN), a wide area network (WAN), such as the Internet, a wireless network, or the like.

In one embodiment, the security monitoring system 150 may include a data management system 152 and a security event identifying system 154, which are described in further detail below with respect to FIG. 6. Some embodiments of the system have different modules and/or other modules than the ones described herein. Similarly, the steps described herein can be distributed among the modules in accordance with other embodiments in a different manner than is described here.

Client device 110 and/or user device 120 may each be a single electronic device, such as a hand-held electronic device (e.g., a smartphone). It will be understood that client device 110 and/or user device 120 can also include a system that includes multiple devices and/or components. The device(s) 110 and/or 120 can comprise a computer, such as the desktop computer, a laptop computer, or a tablet. In some instances, a party 105 and/or 115 uses different devices at different times to interact with security monitoring system 150. In one embodiment, the devices 110 and/or 120 may be include any type of processor-based platform that operates on any suitable operating system that is capable of executing one or more code modules, engines, and/or applications, which store instructions that, when executed by a processor, cause the processor to perform the operations described herein.

The security monitoring system 150 provides the client 105 and/or the user 115 with tools to manage security events in a security event management environment, such as environment 100. Specifically, the security monitoring system 150 can collect data including raw data (e.g., machine data, network data, sensor data, unstructured data, and/or weblogs) from one or more resources 160 (e.g., resource 160-1 through resource 160-n), process the data (e.g., internally and/or using one or more resources) to index the raw data into timestamped events that are searchable, extract values from fields in the indexed raw data, identify security-related events from the indexed raw data to identify groups of events based on criteria, and/or present a summary of groups of the filtered security events in a display view. A resource 160 from which data may be collected can include one or more computing devices, e.g., a server, a router, network devices, and/or a user device 120. The events can pertain to an activity occurring in the environment 100, such as a computer action, access control, endpoint activity, a communication (sent or received over a network), and/or network activity (e.g., network requests, connection attempts, traffic via a network device (e.g., a firewall, a router, a switch, or a network), requests for proxy or HTTP data, or creation of new domains).

Events related to computer and network security may be presented as groups of security events, where each group of security events have a field value (e.g., an IP address) that satisfies a criteria for the group of security events (e.g., a deduplicated list of IP addresses obtained from a plurality of sources). A group of security events may be presented in or as part of a summary that presents information summarizing the security events in the group of security events. The summary may present one or more field values that satisfies the criteria (e.g., the deduplicated list of IP addresses obtained from a plurality of sources) used to determine the group. With a summary of a group of security events, one or more interactive elements may be presented that further enable selective filtering of the summary (and the group of security events). Selectively filtering may enable the summary to be modified by changing a visual appearance of the summary based on interaction with a control by a user when the user determines that the summary contains security events of interest (e.g., "notable events" that require further investigation).

The system may further include one or more display devices, such as display device 170, display device 180, and display device 190. The display devices 170, 180, 190 may enable presentation of information in the security management system for monitoring security events. The display devices 170, 180, 190 may present information via a graphical interface 172, a graphical interface 182, and a graphical interface 192, respectively. The graphical interfaces 172, 182, 192 may be generated by any component in the system, such as the security monitoring system 150, the client device 110, and the user device 120. The graphical interfaces 172, 182, 192 may be included in embodiments illustrated and described in further detail with respect to the screenshots of at least FIGS. 7-19. It may be appreciated that elements described or shown in relation to the graphical interfaces 172, 182, 192 are for purposes of example and that fewer elements, more elements, or different graphical interface elements may be used in implementations of embodiments of the disclosure without departing from the underlying concepts of the present disclosure.

As detailed further below, the client 105 and/or the user 115 can interact with the security monitoring system 150 via a graphical interface 172, 182, 192 to dynamically identify events, such as network-type activities, that are identified as being potentially related to a security threat. Therefore, a client (e.g., the client 105) and/or a user (e.g., the user 115) may have the ability provided by the security monitoring system 150 to reduce time to investigate security events, such as those related to network activity, by using his/her own experience and knowledge to identify the most concerning events.

Figure 6:
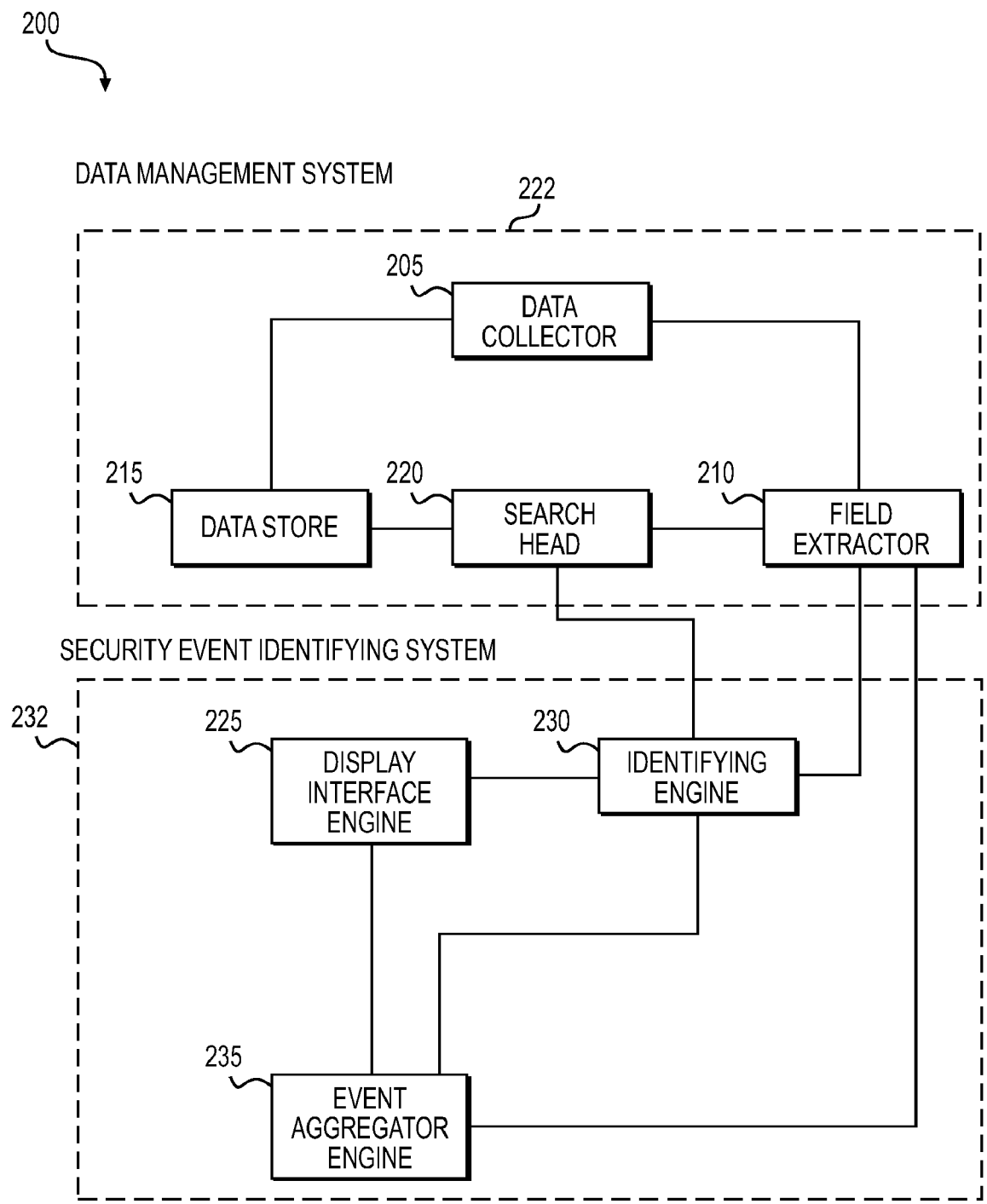
FIG. 6 is a high-level block diagram of an exemplary system for identifying network addresses and/or IDs of a deduplicated list among network data, machine data, and/or events derived from network data and/or machine data, consistent with embodiments of the present disclosure.

Now referring to FIG. 6, a block diagram of an embodiment of a security monitoring system 200 is shown. The security monitoring system 200 may be included or implemented in the security monitoring system 150 of FIG. 5. The security monitoring systems 150, 200 may be, in part or in their entireties, in a network cloud. In some instances, at least part of security monitoring systems 150, 200 may be present on a device, such as a client device 110. In some instances, various components in security monitoring systems 150, 200 may be present in one or more resources. Thus, security monitoring systems 150, 200 may include distributed systems.

In one embodiment, a data management system 222 of security monitoring system 200 may include a data collector 205 that collects data, such as raw data, from one or more resources 160, where the raw data may include unstructured data, structured data, machine data, network data, and/or sensor data. The data can include data from web logs and/or can pertain to web access. The data can pertain to network-based activities. Discrete events can be present within the data. These events can include HTTP requests and/or traffic logs. The events can pertain to an activity occurring in the system 200 such as a computer action, access control activity, endpoint activity, a communication (sent or received over a network), and/or network activity (e.g., network requests, connection attempts, traffic via a network device (e.g., a firewall, a router, a switch, or a network), requests for proxy or HTTP data, or creation of new domains). As described in further detail above, the collected data may be segmented into the events (e.g., time-based events) and particular values can then be extracted from the events.

Initially, as described above, a field extractor 210 may extract a timestamp from each event. Based on the timestamp, data collector 205 may store each event in an appropriate index in a data store 215. The collected data corresponding to a time-based event may indicate a timestamp of an event. The collected data also may include indicate a host device associated with the event and a source of the event. In one embodiment, the host device associated with the event may correspond to a machine (or host device) from which the event originated. The source of the event may indicate source information, such as a source from where the collected data came. The source information may indicate a type of the source, which corresponds to a type of the collected data. The data store 215 may include an indexed data store (e.g., a time-series data store) that stores each event based on indexed data corresponding to timestamps extracted from the events. The timestamped stored events may include information related to computer security or network security.

A search head 220 may then locate events pertinent to a particular analysis at hand. For example, search head 220 may be configured to access and search all or part of the data store 215. Events corresponding to a particular time period may be retrieved based on events having a timestamp within the particular time period. The search may include, e.g., a request to return all events or identifiers of all events having a value for a field (e.g., an IP address field) meeting a criterion (e.g., a deduplicated list of IP addresses obtained from a plurality of sources). A search may originate from a client via a graphical interface or may be received via a display interface engine 225.

For example, in one embodiment, an identifying engine 230 of a security event identifying system 232 may request the search head 220 to produce time-based events for a particular time period. Events with timestamps within the particular time period can then be retrieved by search head 220 from data store 215.

Additionally, in a request to the search head 220, an identifying engine 230 of security event identifying system 232 may specify values for one or more fields used to filter the time-based events to locate events having particular type of information (e.g., computer or network security). The events may be identified based on fields having information related to computing activity such as access control information (e.g., login, logout, access allowed, access failure, or use of default accounts), endpoint information (e.g., malware infections, system configuration, system state, patch status, or time synchronization), and/or network traffic information (e.g., network requests, connection attempts, traffic via a network device, requests for proxy or HTTP data, HTTP requests, or creation of new domains). The search head 220 may search data (e.g., indexed data) of timestamped events for particular fields specified in a search request.

The identifying engine 230 may provide an event aggregator engine 235 with timestamped events that have been identified as having information related to computer or network security based on criterion specified by the identifying engine 230. Based on the events received from the identifying engine 230, the event aggregator engine 235 may determine a group of the events. In a particular embodiment, the event aggregator engine 235 may determine the group of events corresponding to a particular time period based on identifying events that have a timestamp within the particular time period. The event aggregator engine 235 may further determine the group of events using the information that was used to locate the events identified by the identifying engine 230. In a particular embodiment, the event aggregator engine 235 may group the events based on events having one or more field values (e.g., destination IP addresses in the deduplicated list of IP addresses obtained from a plurality of sources) that relate to security information. In this embodiment, the field values of the events may be examined to determine whether they are included in or satisfy a criteria defining such a group (e.g., the deduplicated list of destination IP addresses obtained from a plurality of sources).

In a particular embodiment, the event aggregator engine 235 may determine a group of security events based on the timestamped events provided by the identifying engine 230. The timestamped events may be identified by the identifying engine 230 based on security information associated with criteria specified by the event aggregator engine 235. Following the event aggregator engine's 235 determination as to which values are to be examined for the timestamped events provided by the identifying engine 230, the field extractor 210 may extract the appropriate values and return them to event aggregator engine 235. The event aggregator engine 235 may perform one or more correlation searches of the timestamped searchable events using the one or more extracted values. A correlation search may be performed of the extracted values based on the criteria. The group of security events may be determined based on results of the correlation search.

The criteria used to identify events of interest may be based on one or more fields of one or more timestamped events, such as a value or a range of values. Examples of criteria used to determine a group of security events are described and illustrated with respect to FIGS. 1-4 and 7-19 (e.g., network identifiers, IP addresses, etc.). To identify the events having field values that relate to security information, the event aggregator engine 235 may determine values to extract from the events using the security information. Events that have one or more fields specified by a criteria (e.g., a criteria for a potential security threat) may be added to the group of events. A group of events defined by a particular criteria may be useful for identifying patterns of events that occur in a similar manner or that are related in some way suggesting a potential security threat.

The display interface engine 225 may be responsible for providing an interface that presents information determined by the security event identifying system 232 to a client or a user. The display interface engine 225 may present a graphical interface (e.g., the graphical interface 172, the graphical interface 182, or the graphical interface 192) to a display device (e.g., the display device 170, the display device 180, or the display device 190) coupled to the security monitoring system 200. In a particular embodiment the display interface engine 235 may determine a summary of one or more groups of security-related events determined by the event aggregator engine 235. One or more of these summaries presented in the graphical interface may be presented by the display interface engine 225.

In particular embodiments, the security event identifying system 232 may routinely, periodically, automatically, or dynamically modify the graphical interface for events identified by the data management system 222 based on new raw data collected by the data collector 205. For example, the display interface engine 225 may update the graphical interface to update a summary of a group of security events based on new security events. The new security events may be identified by the event aggregator engine 235 as belonging to the group of security events after the graphical interface had been generated. Further, the additional information displayed in the graphical interface may be updated or modified accordingly based on a modification to a summary of a group of events displayed in the graphical interface.

While an "event" has been described as a timestamped, searchable segment of raw data (e.g., unstructured data, machine data, and/or web logs) in a data store (e.g., a time series data store), an "event" in alternative embodiments may include any kind of security-related information typically referred to as an "event" in a SIEM field, and such events may be derived from raw data. Vendors in a SIEM field may implement a process to segment data based on a "data reduction model" whereby only portions of each segment of data are kept and stored as an event. In alternative embodiments, one or more summaries displayed in a graphical interface as described herein may include one or more summaries of SIEM events that are obtained from data based on application of a data reduction model. A summary of SIEM events may be selectively identified with respect to a summary in a graphical interface. The summary of SIEM events may include features such as one or more interactive elements associated with the summary.

Thus, security monitoring systems 150, 200 may reduce an amount of events presented for analysis to a user by providing a system that organizes and correlates related events. The system further provides tools for identification and analysis of security events that may be related to a potential threat by a particular mechanism or source. These features can be particularly advantageous in the security field, where security threats evolve in technique and style.

As described above, the presently disclosed systems and methods may involve generating and displaying a GUI to a user for presenting obtained blocklists for user selection (e.g., enable vs. disable), aggregated/deduplicated blocklists, interfaces for adding or otherwise generating new blocklists, search/query interfaces for locating machine and/or network data including network identifiers from the blocklists, and visualizations of machine data, network data, and/or events derived from machine/network data including network identifiers from the blocklists. The GUI in this example may be provided to the user via, for example, a client application executable at the user's computing device (e.g., user device 120 of FIG. 5, as described above). In some implementations, the client application may be a web browser executable at the user's device, and the GUI may be provided by the data management system as part of a web service accessible to the user via a web page loaded within the web browser. Alternatively, the client application may be a standalone software application executable at the user's device for providing the security event identification functionality described herein.

As a preliminary matter, the presently disclosed systems and methods may involve generating visualizations of high-level views and dashboards for the identification of security events. In one embodiment, the presently disclosed systems and methods may involve generating a "security posture" dashboard, which may provide a high-level visual summary of the notable events across all of a deployment in a preceding time period, such as the past 24 hours. This security posture dashboard may update in real time, in addition to displaying trend indications over the preceding time period, and "billboard" listings of top rules, sources, and destinations. The presently disclosed systems and methods may also involve generating an "incident review" dashboard, which may display details of all notable events identified within the deployment, enable monitoring of notable event activity, filtering of events by criteria, such as urgency or domain, or managing of the status of the notable events. The incident review dashboard may enable acting on notable events, such as by visualizing each notable event similar to a "ticket."

It should be appreciated that any of the graphical interfaces depicted in FIGS. 7-19, described below, may represent a web page that is presented to a user, with the graphical interface including one or more interactive elements (such as radio buttons, drop-down menus, interactive elements, selectable controls, data entry fields) that may be selected and/or activated by a user. The display of the graphical interface may result from any suitable method, including the execution of code or instructions, interpretation of markup language, etc. by a processing element (such as a browser or other application, computer, microprocessor, central processing unit, etc.). Further, the response to (or processing of) the selection or activation of a graphical interface element may be the result of the execution of code or instructions, interpretation of markup language, etc. by a processing element (such as a browser or other application, computer, microprocessor, central processing unit, etc.). Thus, in some embodiments a method, process, function, or operation may be implemented as a result of the execution of code or a set of instructions by a suitably programmed processor or computing device.

It should be appreciated that FIGS. 7-19, described below, depicting the graphical interface and associated elements may also or alternatively be associated with a software-implemented process or method that is implemented by a suitably programmed processor or computing device in order to: (a) generate one or more of the depicted graphical interface elements; (b) permit a user to interact with one or more of the graphical interface elements (such as by activating an element or entering data into a data field); (c) process a user's selection or activation of a graphical interface element, or entry of data into a data field; or (d) perform one or more processes, operations or functions associated with the inventive service.

FIG. 7 depicts a screenshot of an exemplary user interface 300 by which a user may view a plurality of blocklists or "Threat Lists" 302 obtained from a plurality of sources. As shown in FIG. 7, interface 300 may display a name, type, description, URL, updating interval, and status (enabled vs. disabled by a user) for each of the blocklists or threat lists 302. In addition, interface 300 may display one or more user elements 308 by which a user may sort the blocklists or threat lists 302 by any of those depicted columns, and/or perform an action on any of the blocklists or threat lists, such as an action to clone one of the blocklists or threat lists. Also, as shown in FIG. 7, a user may selectively enable or disable any of the blocklists 302 by selecting one of user elements 306, thereby selectively including or excluding the contents of each blocklist from being aggregated into and deduped from the plurality of selected blocklists.

FIG. 8 depicts a screenshot of an exemplary user interface 310 by which a user may add a new blocklist or "threat list." Specifically, as shown in FIG. 8, interface 310 may include a plurality of forms 312 by which the user may add a new threat list to the list of threat lists that can be selectively enabled or disabled. For example, as shown in FIG. 8, the plurality of forms 312 may include a name, type, description, URL (e.g., a source of the threat list), update interval, post arguments (e.g., to be passed to the URL), etc. that can be filled in by the user for the new blocklist or "threat list." As shown in FIG. 8, the plurality of forms 312 may also include forms for entering one or more parsing options, such as a delimiting regular expression (e.g., used to split lines in a threat list), an extracting regular expression (e.g., used to extract fields from individual lines of a threat list), fields (e.g., to rename or combine fields), an ignoring regular expression (e.g., to ignore lines in a threat list), download options, and so on.

FIG. 9 depicts a screenshot of an exemplary user interface 320 by which a user may create new correlation searches. Specifically, as described above with respect to FIGS. 2-4, a correlation search may be used for identifying IP addresses or other network identifiers from an aggregated threat list or blocklist within machine data, network data, or events derived from machine and/or network data. In one embodiment, a user may use interface 320 to generate new correlation searches (e.g., using user element 324), and view and manipulate existing correlation searches (e.g., using user elements 322, 326).

FIG. 10 depicts a screenshot of an exemplary user interface 330 by which a user may create and execute specific manual queries to view statistics associated with one or more threat lists. For example, as shown in FIG. 10, a user may search for "threatlists" in search form 332 and be presented with one or more "events," "statistics," and/or "visualization" tabs 334. As shown in the embodiment of FIG. 10, the user may be provided with a list of threat lists 336 responsive to the query.

Figure 11:
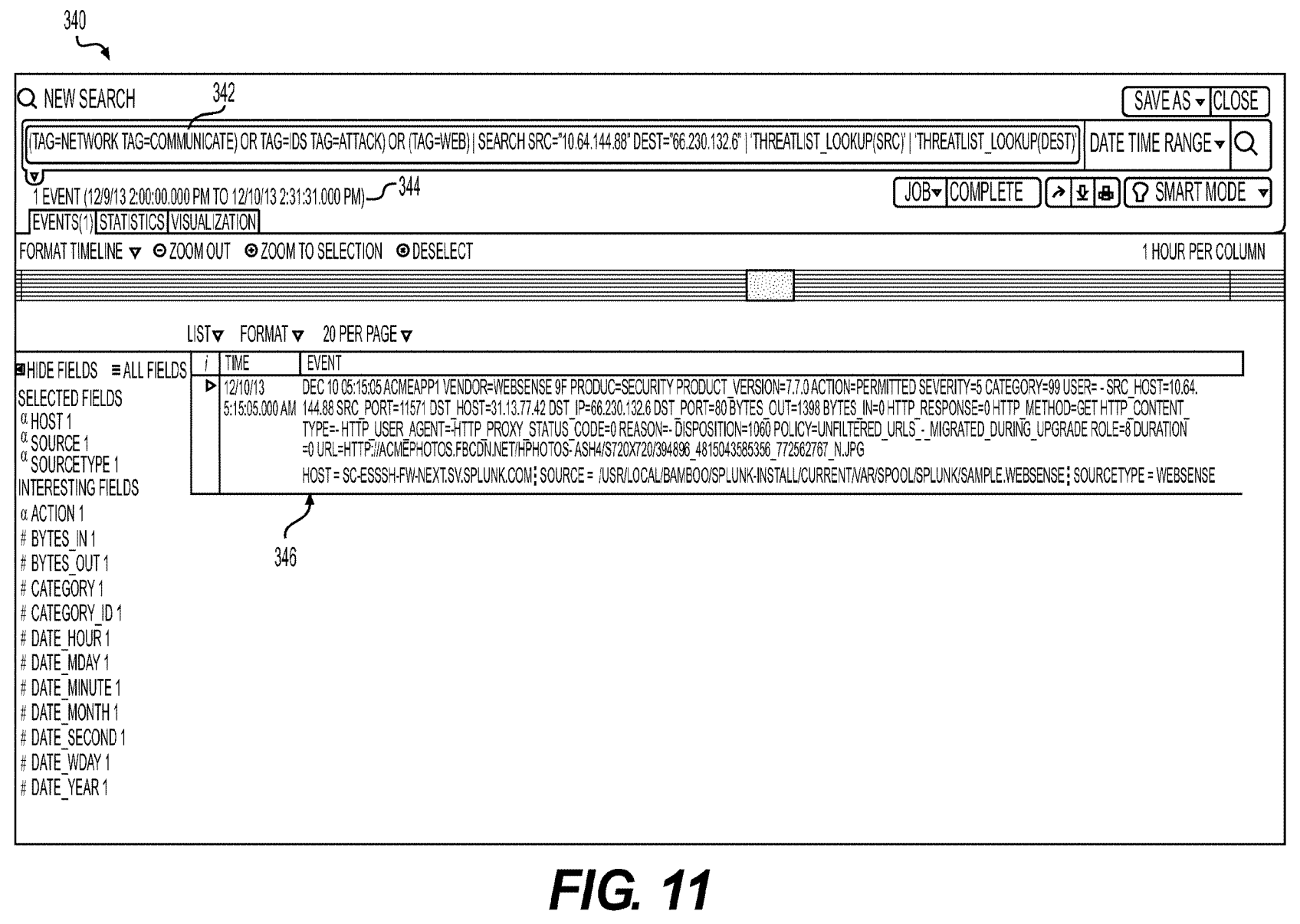

FIG. 11 depicts a screenshot of another exemplary user interface 340 by which a user may create and execute specific manual queries to view statistics associated with one or more threat lists. Specifically, a user may enter a search string 342 that returns a single event 344 including metadata 346.

Figure 12:
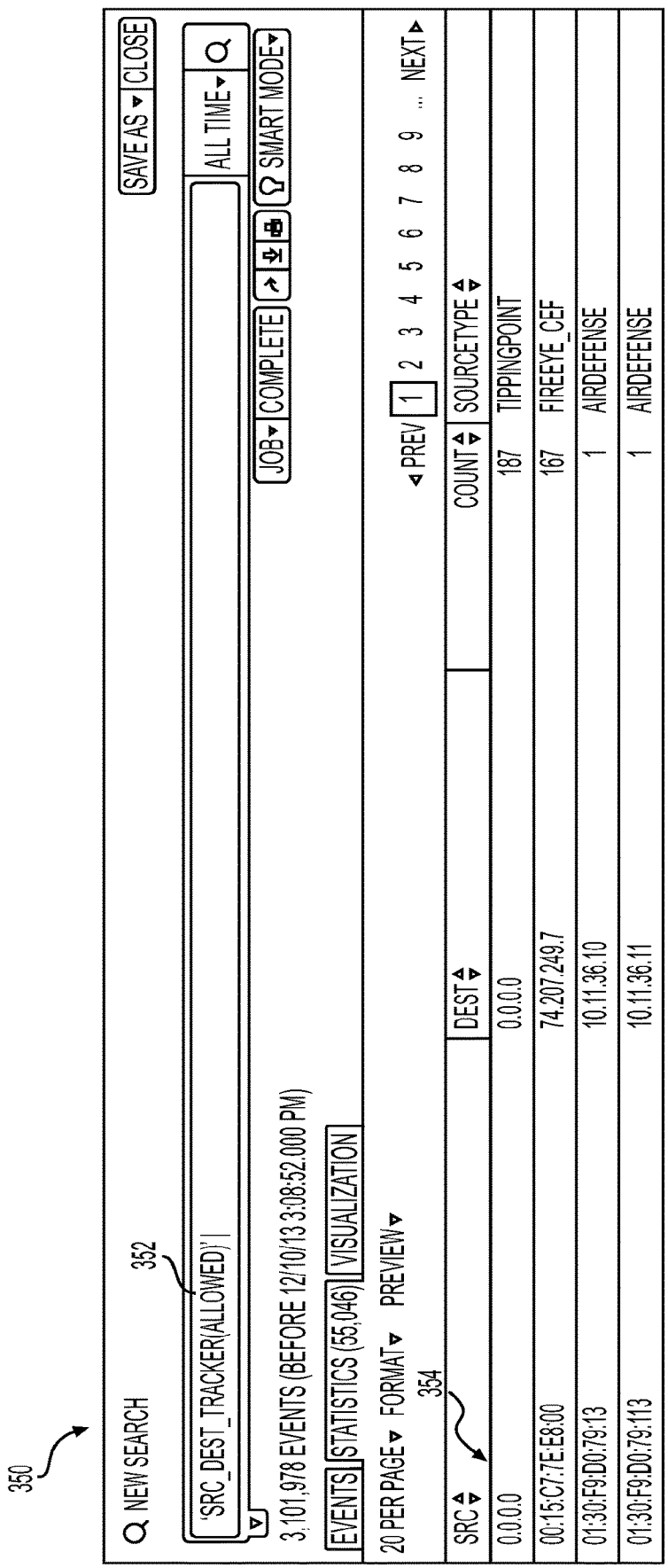

FIG. 12 depicts a screenshot of another exemplary user interface 350 by which a user may create and execute specific manual queries to view statistics associated with one or more threat lists. Specifically, as shown in FIG. 12, a user may query string 352 requesting to view "Allowed" source and/or destination addresses 354.

Figure 13:
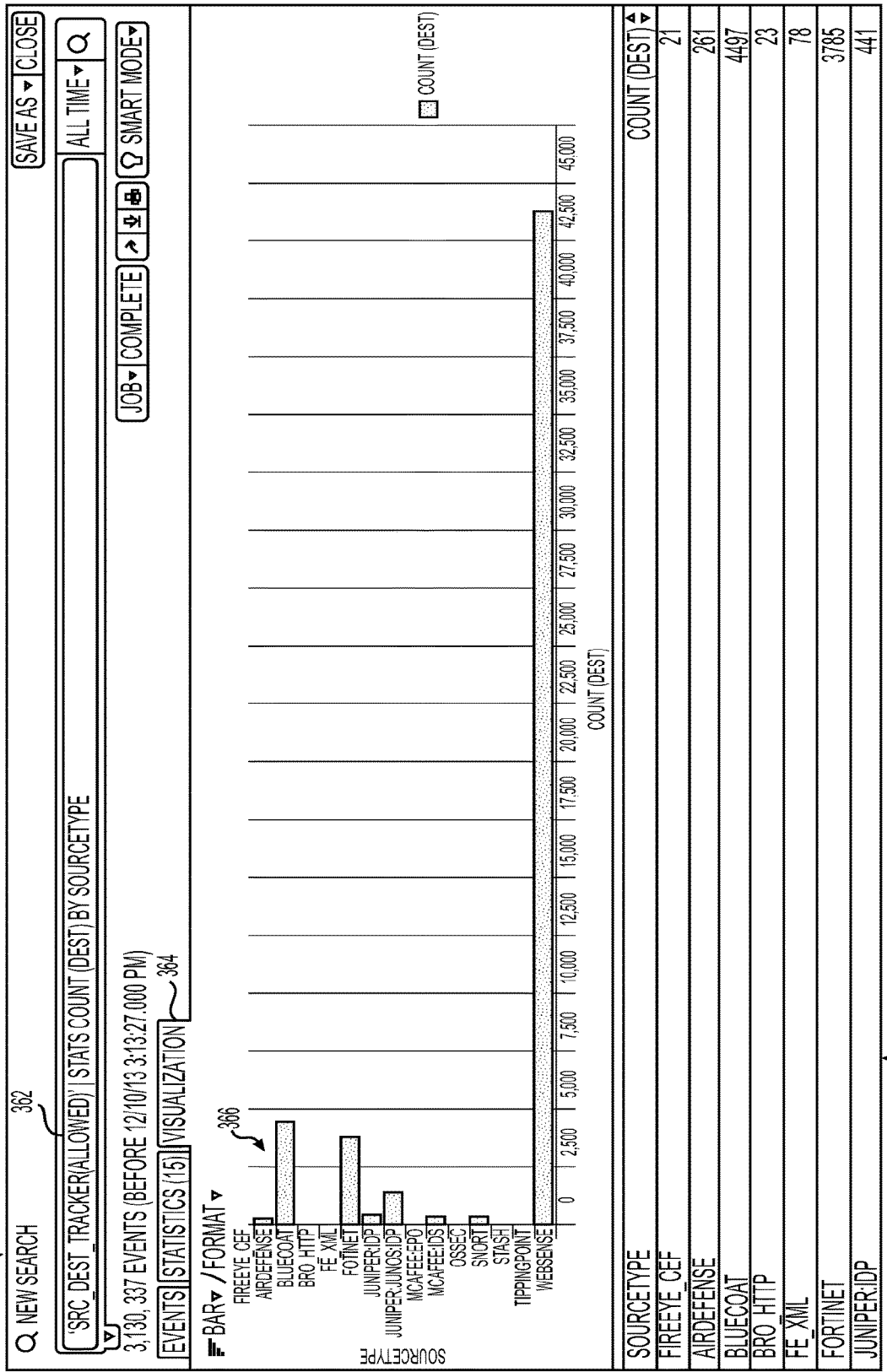

FIG. 13 depicts a screenshot of another exemplary user interface 360 by which a user may create and execute specific manual queries to view statistics associated with one or more threat lists. Specifically, as shown in FIG. 13, a user may query string 362 requesting to view "Allowed" source and/or destination addresses in a visualization tab 364 including a bar graph 366 visualizing, e.g., in this case, statistics (e.g., a count) of destination by, e.g., "Source-Type." Of course, it should be appreciated that the user may view any source type or any statistic. As shown in FIG. 13, the user interface 360 may also display a table 368 of the searched statistic, in this case, "SourceType" by "Count."

Figure 14:
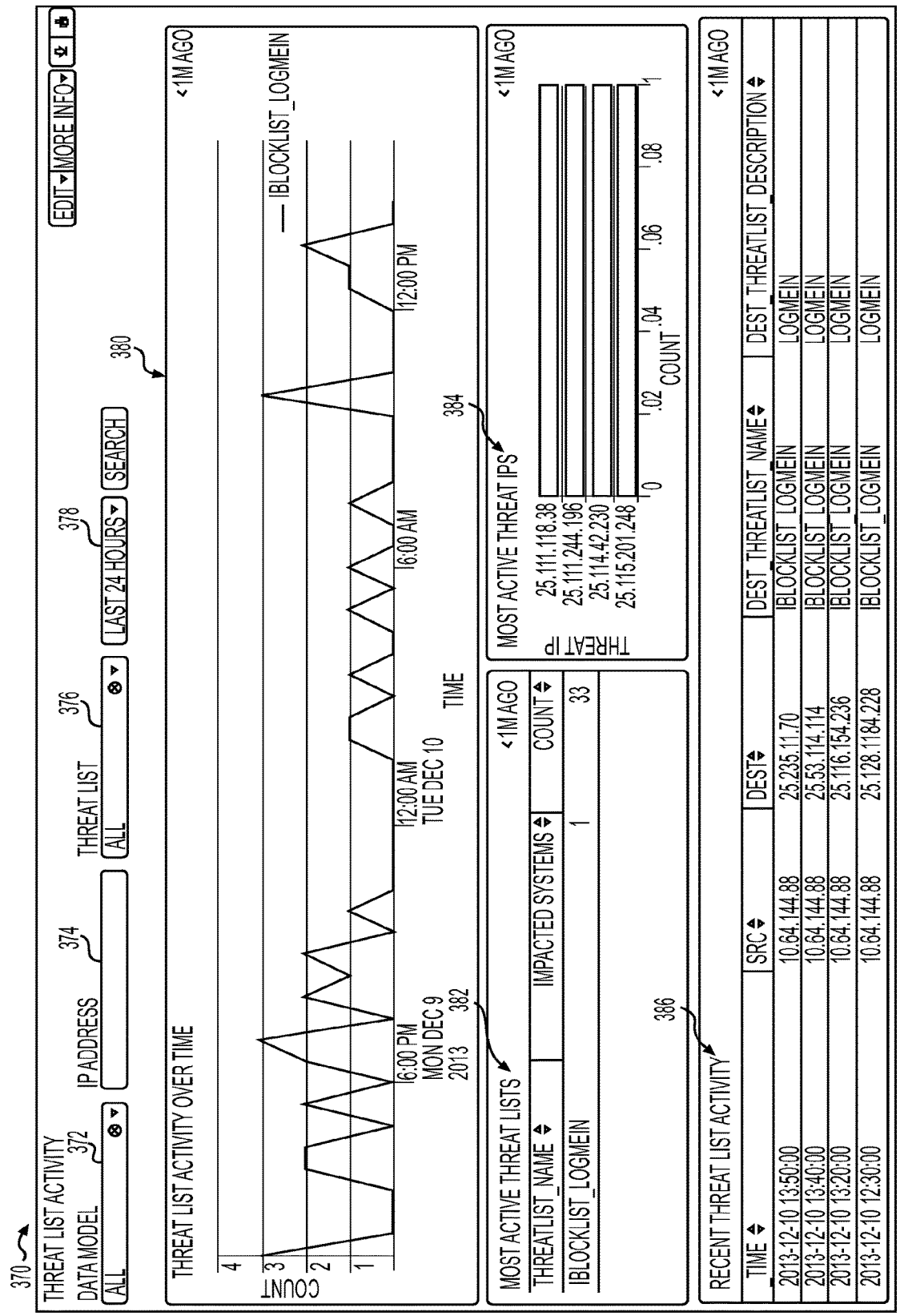
Figure 15:
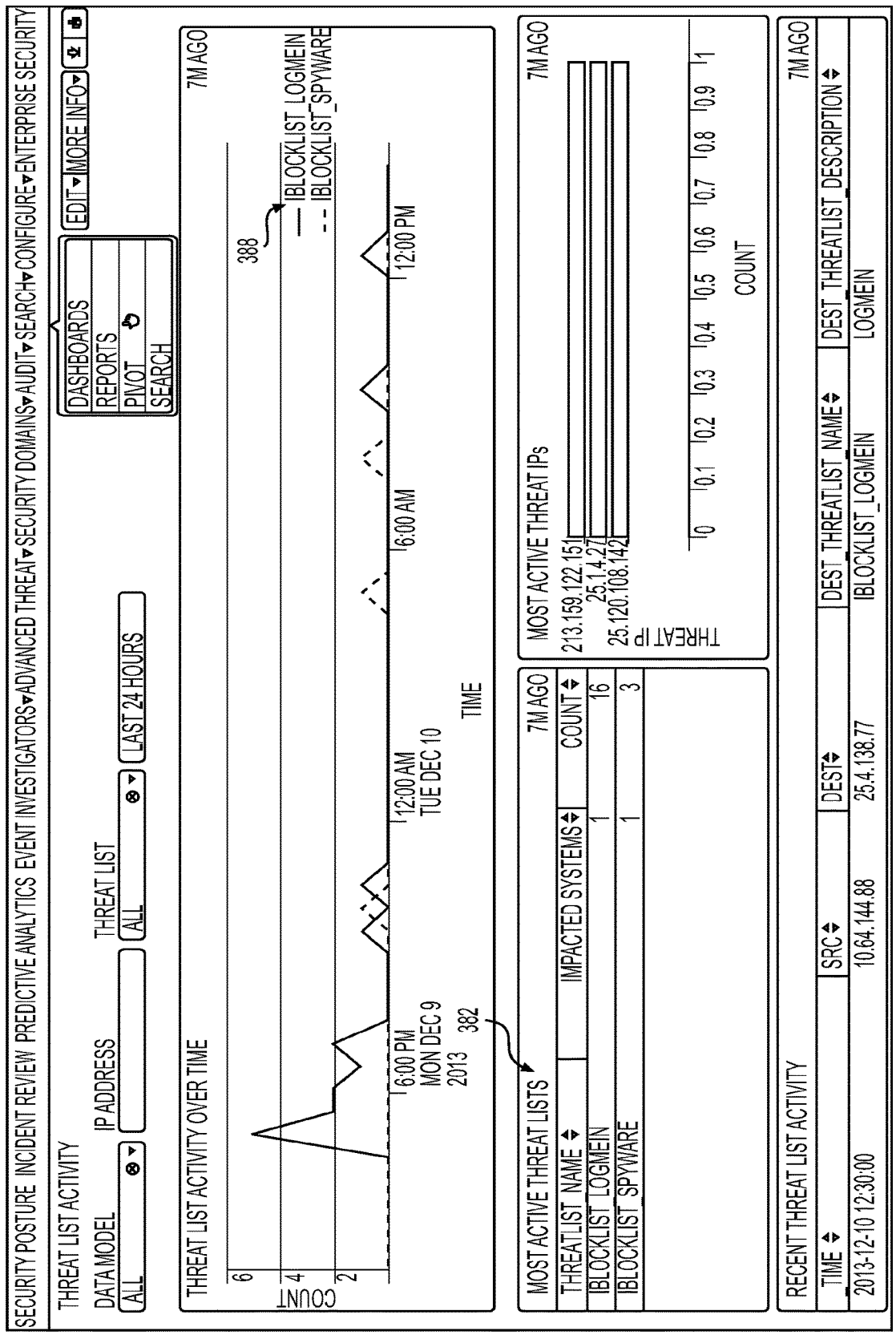

FIG. 14 depicts a screenshot of an exemplary user interface 370 for displaying threat list activity. As shown in FIG. 14, in one embodiment, interface 370 may include one or more user elements by which the user may manipulate the applied data model (372), the one or more selected IP addresses (374), the applied threat list (376), the applied time range (378), and so on. Also as shown in FIG. 14, user interface 370 may display a visualization (e.g., a bar graph, line graph, histogram, etc.) of threat list activity over time based on the selections made through the above-described user elements. User interface 370 may also include a table 382 for displaying the most active threat lists, e.g., by event count; a table 384 for displaying the most active threat IPs, e.g., by event count; and/or a table 386 for displaying recent threat list activity (e.g., by time, source, destination, threat list name, threat list description, etc.). As shown in FIG. 15, in one embodiment, the user interface 370 may be modified to simultaneously display more than one threat list in the displayed chart, as shown by chart legend 388 and table 382.

Figure 16:
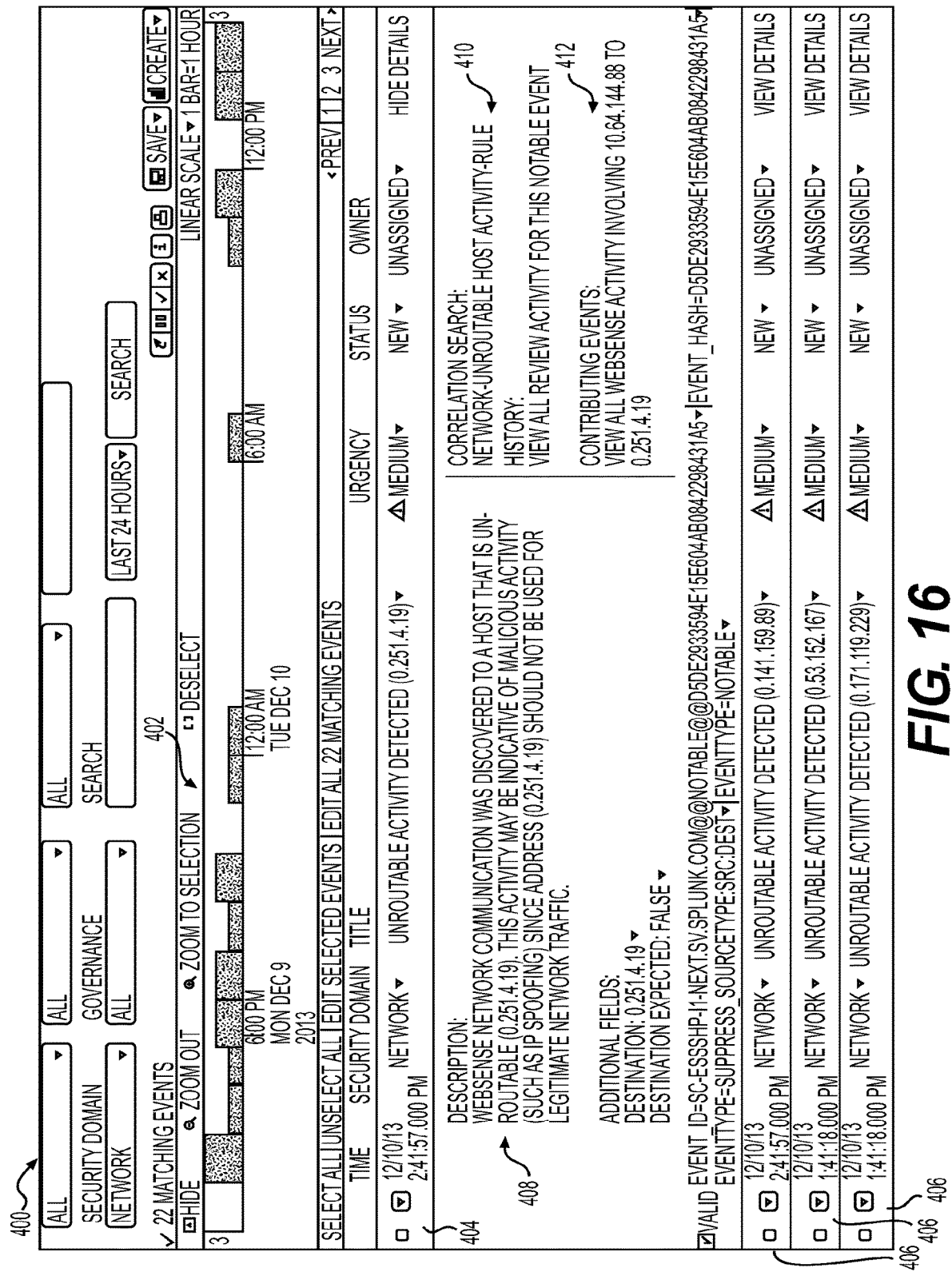

FIG. 16 depicts a screenshot of another exemplary user interface 400 for displaying identified security events. For example, as shown in FIG. 16, the identified security events may be represented in a histogram 402 based on their time. In addition, the identified security events may be displayed in a list, whereby, e.g., a first event 404 may be expanded to show related metadata 408 (e.g., description, additional fields, correlation search 410, contributing events 412, etc.), and additional events 406 may be partially and/or temporarily hidden.

Figure 17:
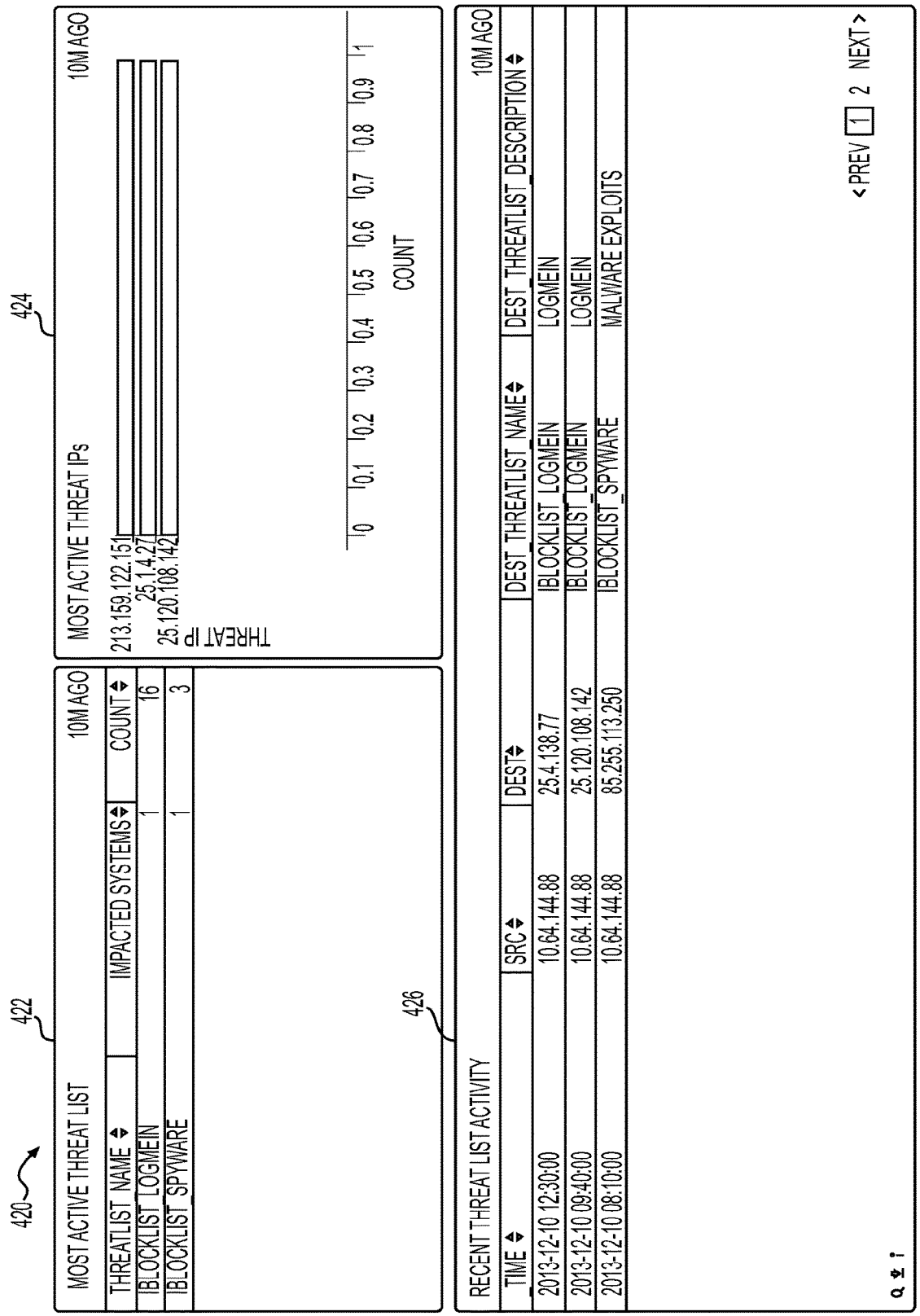

FIG. 17 depicts a screenshot of another exemplary user interface 420 for displaying threat list activity, including a first table 422 displaying the most active threat lists; a table 424 displaying the most active threat IPs; and a table 426 displaying the most recent threat list activity.

Figure 18:
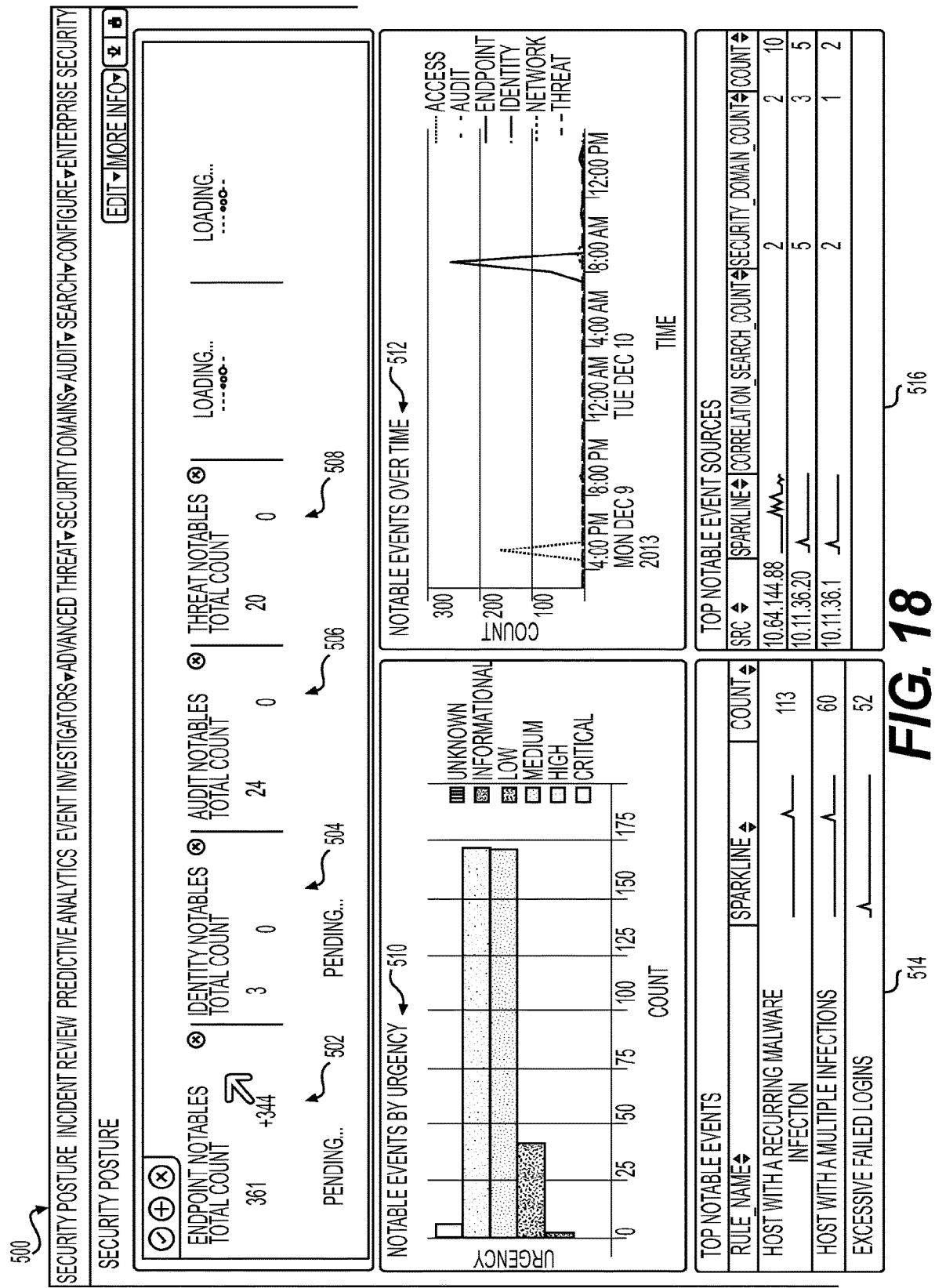

FIG. 18 depicts a screenshot of another exemplary user interface 500 for displaying an embodiment of a "security posture" interface of the type described above. As shown in FIG. 18, in one embodiment, interface 500 may depict an "endpoint notables total count" 502, an "identity notables total count" 504, an "audit notables total count" 506, a "threat notables total count" 508, and so on. As shown in FIG. 18, interface 500 may also display a bar chart 510 of notable events by urgency (e.g., unknown, informational, low, medium, high, critical, etc.). As shown in FIG. 18, interface 512 may also display a line graph or histogram 512 of notable events over time (in some cases by categories, e.g., access, audit, endpoint, identity, network, threat, etc.). As shown in FIG. 18, interface 512 may also display a table 514 of "top notable events" and/or a table 516 of "top notable event sources."

Figure 19:
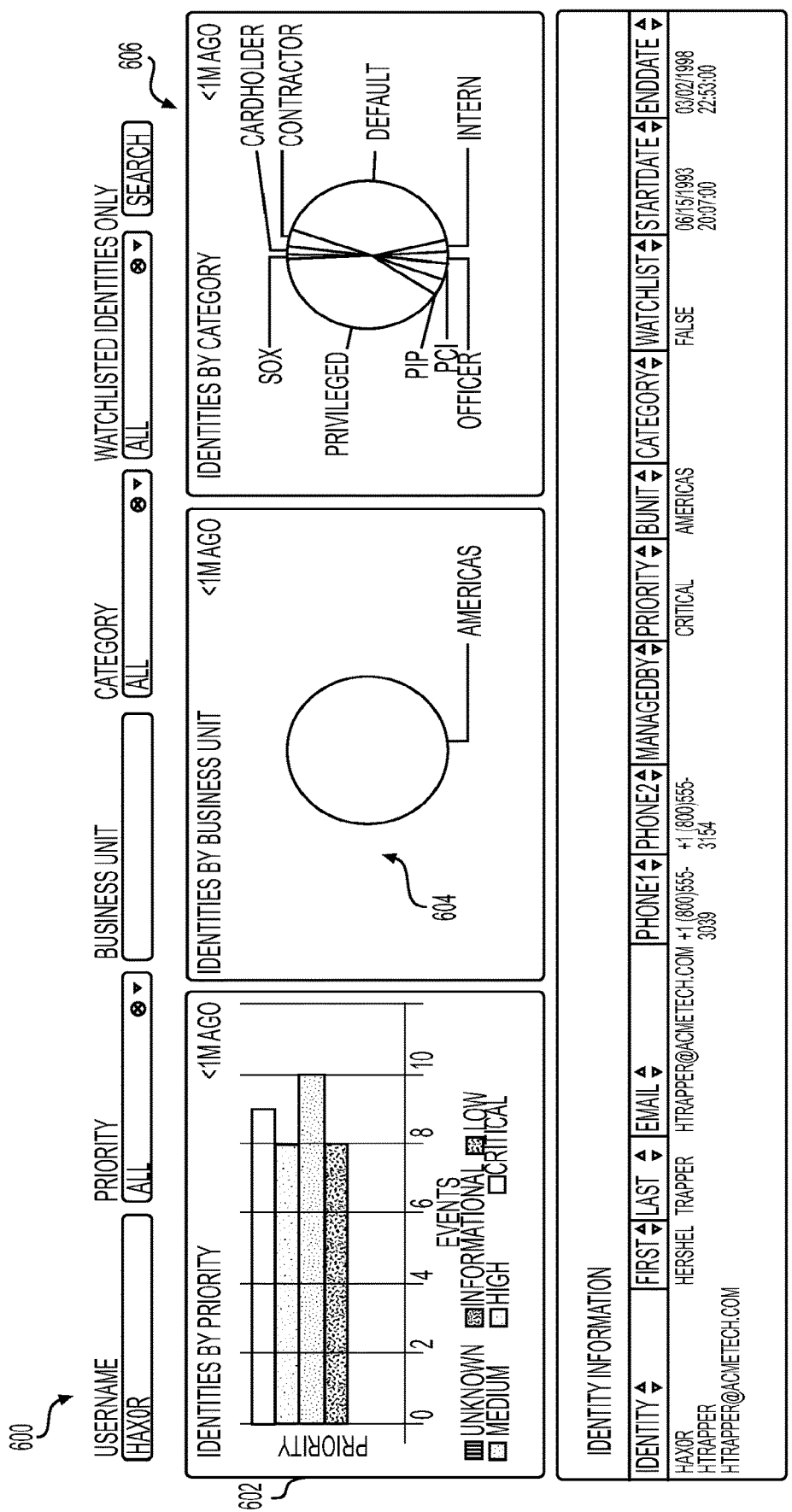

FIG. 19 depicts a screenshot of an exemplary user interface 600 for displaying security events by identity (e.g., user or individual identities). For example, as shown in FIG. 19, user interface 600 depicts a bar chart 602 of identities by priority (e.g. unknown, informational, low, medium, high, critical, etc.); a pie chart 604 of identities by business unit, for example; and a pie chart 606 of identities by category.

After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that various embodiments of the present disclosure, as described above in the examples of FIGS. 1-19, may be implemented using computer system 1200. Specifically, the examples described above with respect to FIGS. 1-19, or any part(s) or function(s) thereof, may be implemented using hardware, software modules, firmware, tangible computer readable media having instructions stored thereon, or a combination thereof and may be implemented in one or more computer systems or other processing systems.

Figure 20:
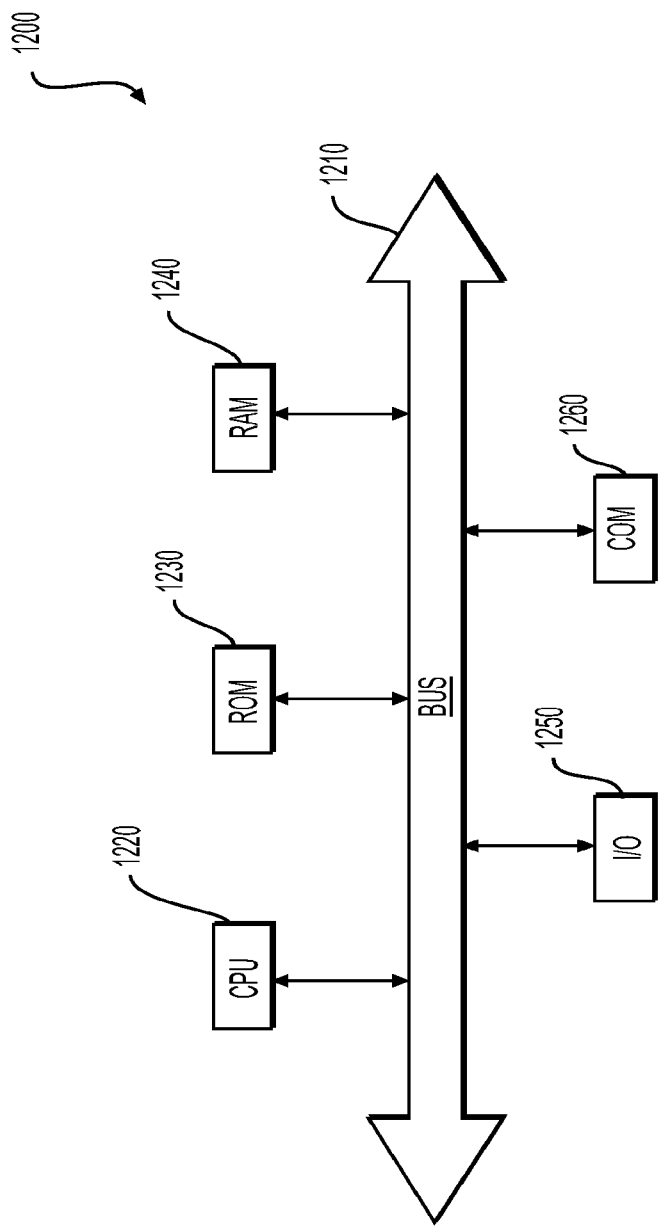
FIG. 20 is a high level block diagram of an exemplary computer system in which embodiments of the present disclosure may be implemented.

FIG. 20 illustrates a high-level functional block diagram of an exemplary computer system 1200, in which embodiments of the present disclosure, or portions thereof, may be implemented, e.g., as computer-readable code. For example, any of the client device 110, user device 120, resources 160, display devices 170, 180, 190, security monitoring system 110, data management system 152, security event identifying system 154, data management system 222, and/or security event identifying system 232 of FIGS. 5 and 6 may be implemented in computer system 1200 using hardware, software, firmware, tangible computer readable media having instructions stored thereon, or a combination thereof and may be implemented in one or more computer systems or other processing systems. Hardware, software, or any combination of such may embody any of the modules and components in FIGS. 5 and 6.

As shown in FIG. 20, computer system 1200 includes a central processing unit (CPU) 1220. CPU 1220 may be any type of processor device including, for example, any type of special purpose or a general purpose microprocessor device. As will be appreciated by persons skilled in the relevant art, CPU 1220 also may be a single processor in a multi-core/multiprocessor system, such system operating alone, or in a cluster of computing devices operating in a cluster or server farm. CPU 1220 is connected to a data communication infrastructure 1210, for example, a bus, message queue, network, or multi-core message-passing scheme. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Computer system 1200 also includes a main memory 1240, for example, random access memory (RAM), and may also include a secondary memory 1230. Secondary memory 1230, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 1230 may include other similar means for allowing computer programs or other instructions to be loaded into computer system 1200. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 1200.

Computer system 1200 may also include a communications interface ("COM") 1260. Communications interface 1260 allows software and data to be transferred between computer system 1200 and external devices. Communications interface 1260 may include a modem, a network interface (such as an Ethernet card), a communications port, a PCMCIA slot and card, or the like. Software and data transferred via communications interface 1260 may be in the form of signals, which may be electronic, electromagnetic, optical, or other signals capable of being received by communications interface 1260. These signals may be provided to communications interface 1260 via a communications path of computer system 1200, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 1200 also may include input and output ports 1250 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, this disclosure is not to be considered as limited by the foregoing description.

The breadth and scope of the present disclosure should not be limited by any of the above-described exemplary embodiments, but should be defined only in accordance with the following claims and their equivalents.

What is claimed is:

1. A computer-implemented method for identifying security threats involving a component in an information technology (IT) environment, the method comprising:

obtaining, from the component, machine data, wherein the machine data is obtained over a network in the IT environment, and wherein the machine data includes a record of activity of the component in the IT environment over a period of time;

generating a first plurality of events from the machine data, wherein each event of the first plurality of events provides a single record of activity associated with a single point in time, and wherein generating each event of the first plurality of events includes:

identifying boundaries defining the event within the machine data, wherein the boundaries are indicated by one or more predefined characters, segmenting the machine data using the one or more predefined characters, wherein segmenting includes dividing the machine data into a plurality of segments bounded by the one or more predefined characters, and wherein a segment from the plurality of segments represents the event, determining, using the machine data, a timestamp for the event, wherein the timestamp indicates the single point in time, associating the timestamp with the event, and storing the event and the timestamp in a field-searchable data store;

receiving a request to generate a first display, wherein the first display includes elements enabling input of queries to search the field-searchable data store;

receiving input entered using the first display, wherein the input includes a search query specifying criteria for notable events, and wherein the search query includes:

a field associated with a type of information contained in one or more events stored in the field-searchable data store, wherein the field is associated with an extraction rule used, during execution of the search query, to extract values for the field from the one or more events, a condition for the values extracted using the extraction rule, and a time range;

executing the search query to identify a notable event, wherein executing the search query includes:

identifying a second plurality of events from the first plurality of events that each have a respective timestamp that is within the time range included in the search query, wherein at least one event of the second plurality of events corresponds to: a network message, an execution of a program or script, an indication of a fault exception, or an indication of an unhandled interrupt, extracting a value from each event of the second plurality of events, wherein the value is extracted using the extraction rule, and wherein the value is associated with the field included in the search query, and determining that a third plurality of events from the second plurality of events comprises the notable event, wherein each of the third plurality of events is associated with an extracted value satisfying the condition included in the search query, and wherein the extracted value includes a network location that is matched against a threat location list stored in an index, and not including an event from the second plurality of events in the third plurality of events when the value extracted from the event does not satisfy the condition;

determining a type of potential security issue associated with the notable event, wherein the type of potential security issue is determined based on the third plurality of events that comprise the notable event, and wherein the type of potential security issue poses a threat to the operational performance or security of the IT environment; and transmitting output to generate a second display, wherein the second display includes graphical elements representing the notable event and the type of potential security issue, and wherein the graphical elements include a representation of the time range included in the search query.

2. The computer-implemented method of claim 1, wherein extracting the value from each event of the second plurality of events includes using a late-binding schema, wherein the late-binding schema is a schema applied to events during execution of the search query.

3. The computer-implemented method of claim 1, wherein the component in the IT environment includes one or more of: a web server, an application server, a host, a database, a firewall, a router, an operating system, a software application, a mobile device, or a sensor.

4. The computer-implemented method of claim 1, wherein the machine data includes one or more of: network data, an operating system log, an application server log, a web server log, a firewall log, a software application log, or an activity log.

5. The computer-implemented method of claim 1, wherein executing the search query includes a search head sending the search query to an indexer, and wherein the indexer searches the field-searchable data store for events responsive to the search query.

6. The computer-implemented method of claim 1, further comprising generating an alert in response to identifying the notable event.

7. The computer-implemented method of claim 1, wherein the value is a first value, wherein the search query specifies one or more additional fields in the machine data and additional values for the one or more additional fields, wherein executing the search query further includes extracting, for each event of the second plurality of events, one or more second values from the event, and wherein determining the type of potential security issue is based on a combination of first value and the one or more second values.

8. The computer-implemented method of claim 1, wherein the search query is executed each time the machine data is obtained or at a periodic interval.

9. The computer-implemented method of claim 1, wherein the content of the machine data is not modified when the machine data is segmented into the plurality of events.

10. A non-transitory computer-readable storage medium storing instructions which, when executed by one or more processors, cause performance of operations, comprising:

obtaining, from a component in an information technology (IT) environment, machine data, wherein the machine data is obtained over a network, and wherein the machine data includes a record of activity of the component in the IT environment over a period of time;

generating a first plurality of events from the machine data, wherein each event of the first plurality of events provides a single record of activity associated with a single point in time, and wherein generating each event of the first plurality of events includes:

identifying boundaries defining the event within the machine data, wherein the boundaries are indicated by one or more predefined characters, segmenting the machine data using the one or more predefined characters, wherein segmenting includes dividing the machine data into a plurality of segments bounded by the one or more predefined characters, and wherein a segment from the plurality of segments represents the event, determining, using the machine data, a timestamp for the event, wherein the timestamp indicates the single point in time, associating the timestamp with the event, and storing the event and the timestamp in a field-searchable data store;

receiving a request to generate a first display, wherein the first display includes elements enabling input of queries to search the field-searchable data store;

receiving input entered using the first display, wherein the input includes a search query specifying criteria for notable events, and wherein the search query includes:
- a field associated with a type of information contained in one or more events stored in the field-searchable data store, wherein the field is associated with an extraction rule used, during execution of the search query, to extract values for the field from the one or more events,
- a condition for the values extracted using the extraction rule, and
- a time range;

executing the search query to identify a notable event, wherein executing the search query includes:
- identifying a second plurality of events from the first plurality of events that each have a respective timestamp that is within the time range included in the search query, wherein at least one event of the second plurality of events corresponds to: a network message, an execution of a program or script, an indication of a fault exception, or an indication of an unhandled interrupt,
- extracting a value from each event of the second plurality of events, wherein the value is extracted using the extraction rule, and wherein the value is associated with the field included in the search query, and
- determining that a third plurality of events from the second plurality of events comprises the notable event, wherein each of the third plurality of events is associated with an extracted value satisfying the condition included in the search query, and wherein the extracted value includes a network location that is matched against a threat location list stored in an index, and
- not including an event from the second plurality of events in the third plurality of events when the value extracted from the event does not satisfy the condition;

determining a type of potential security issue associated with the notable event, wherein the type of potential security issue is determined based on the third plurality of events that comprise the notable event, and wherein the type of potential security issue poses a threat to the operational performance or security of the IT environment; and transmitting output to generate a second display, wherein the second display includes graphical elements representing the notable event and the type of potential security issue, and wherein the graphical elements include a representation of the time range included in the search query.

11. The non-transitory computer-readable storage medium of claim 10, wherein extracting the value from each event of the second plurality of events includes using a late-binding schema, wherein the late-binding schema is a schema applied to events during execution of the search query.

12. The non-transitory computer-readable storage medium of claim 10, wherein the component in the IT environment includes one or more of: a web server, an application server, a host, a database, a firewall, a router, an operating system, a software application, a mobile device, or a sensor.

13. The non-transitory computer-readable storage medium of claim 10, wherein the machine data includes one or more of: network data, an operating system log, an application server log, a web server log, a firewall log, a software application log, or an activity log.

14. The non-transitory computer-readable storage medium of claim 10, wherein executing the search query includes a search head sending the search query to an indexer, and wherein the indexer searches the field-searchable data store for events responsive to the search query.

15. The non-transitory computer-readable storage medium of claim 10, further comprising generating an alert in response to identifying the notable event.

16. The non-transitory computer-readable storage medium of claim 10, wherein the value is a first value, wherein the search query specifies one or more additional fields in the machine data and additional values for the one or more additional fields, wherein executing the search query further includes extracting, for each event of the second plurality of events, one or more second values from the event, and wherein determining the type of potential security issue is based on a combination of the first value and the one or more second values.

17. The non-transitory computer-readable storage medium of claim 10, wherein the search query is executed each time the machine data is obtained or at a periodic interval.

18. The non-transitory computer-readable storage medium of claim 10, wherein the content of the machine data is not modified when the machine data is segmented into the plurality of events.

19. An apparatus, comprising:
one or more processors;
a non-transitory computer-readable storage medium coupled to the one or more processors, the non-transitory computer-readable storage medium storing instructions which, when executed by the one or more processors, cause the apparatus to:
- obtain, from a component in an information technology (IT) environment, machine data, wherein the machine data is obtained over a network, and wherein the machine data includes a record of activity of the component in the IT environment over a period of time;
- generate a first plurality of events from the machine data, wherein each event of the first plurality of events provides a single record of activity associated with a single point in time, and wherein generating each event of the first plurality of events includes:
  - identifying boundaries defining the event within the machine data, wherein the boundaries are indicated by one or more predefined characters,
  - segmenting the machine data using the one or more predefined characters, wherein segmenting includes dividing the machine data into a plurality of segments bounded by the one or more predefined characters, and wherein a segment from the plurality of segments represents the event,
  - determining, using the machine data, a timestamp for the event, wherein the timestamp indicates the single point in time,
  - associating the timestamp with the event, and
  - storing the event and the timestamp in a field-searchable data store;
- receive a request to generate a first display, wherein the first display includes elements enabling input of queries to search the field-searchable data store;

receive input entered using the first display, wherein the input includes a search query specifying criteria for notable events, and wherein the search query includes:
- a field associated with a type of information contained in one or more events stored in the field-searchable data store, wherein the field is associated with an extraction rule used, during execution of the search query, to extract values for the field from the one or more events,
- a condition for the values extracted using the extraction rule, and
- a time range;

execute the search query to identify a notable event, wherein executing the search query includes:
- identifying a second plurality of events from the first plurality of events that each have a respective timestamp that is within the time range included in the search query, wherein at least one event of the second plurality of events corresponds to: a network message, an execution of a program or script, an indication of a fault exception, or an indication of an unhandled interrupt,
- extracting a value from each event of the second plurality of events, wherein the value is extracted using the extraction rule, and wherein the value is associated with the field included in the search query, and
- determining that a third plurality of events from the second plurality of events comprises the notable event, wherein each of the third plurality of events is associated with an extracted value satisfying the condition included in the search query, and wherein the extracted value includes a network location that is matched against a threat location list stored in an index, and
- not including an event from the second plurality of events in the third plurality of events when the value extracted from the event does not satisfy the condition;

determine a type of potential security issue associated with the notable event, wherein the type of potential security issue is determined based on the third plurality of events that comprise the notable event, and wherein the type of potential security issue poses a threat to the operational performance or security of the IT environment; and transmit output to generate a second display, wherein the second display includes graphical elements representing the notable event and the type of potential security issue, and wherein the graphical elements include a representation of the time range included in the search query.

20. The apparatus of claim 19, wherein extracting the value from each event of the second plurality of events includes using a late-binding schema, wherein the late-binding schema is a schema applied to events during execution of the search query.

21. The apparatus of claim 19, wherein the component in the IT environment includes one or more of: a web server, an application server, a host, a database, a firewall, a router, an operating system, a software application, a mobile device, or a sensor.

22. The apparatus of claim 19, wherein the machine data includes one or more of: network data, an operating system log, an application server log, a web server log, a firewall log, a software application log, or an activity log.

23. The apparatus of claim 19, wherein executing the search query includes a search head sending the search query to an indexer, and wherein the indexer searches the field-searchable data store for events responsive to the search query.

24. The apparatus of claim 19, further comprising generating an alert in response to identifying the notable event.

25. The apparatus of claim 19, wherein the value is a first value, wherein the search query specifies one or more additional fields in the machine data and additional values for the one or more additional fields, wherein executing the search query further includes extracting, for each event of the second plurality of events, one or more second values from the event, and wherein determining the type of potential security issue is based on a combination of first value and the one or more second values.

26. The apparatus of claim 19, wherein the search query is executed each time the machine data is obtained or at a periodic interval.

27. The apparatus of claim 19, wherein the content of the machine data is not modified when the machine data is segmented into the plurality of events.

* * * * *